(12) United States Patent
Chen

(10) Patent No.: US 12,010,222 B2
(45) Date of Patent: Jun. 11, 2024

(54) QUANTUM-COMPUTING THREATS SURVEILLANCE SYSTEM AND METHOD FOR USE IN QUANTUM COMMUNICATION ENVIRONMENTS

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 511 days.

(21) Appl. No.: 17/229,874

(22) Filed: Apr. 14, 2021

(65) Prior Publication Data

US 2023/0155822 A1 May 18, 2023

(51) Int. Cl.
| | |
|---|---|
| *H04L 9/08* | (2006.01) |
| *G06N 10/00* | (2022.01) |
| *H04B 10/70* | (2013.01) |
| *H04L 9/00* | (2022.01) |
| *H04L 9/40* | (2022.01) |

(52) U.S. Cl.
CPC ........... *H04L 9/0852* (2013.01); *G06N 10/00* (2019.01); *H04B 10/70* (2013.01); *H04L 9/002* (2013.01); *H04L 9/0858* (2013.01); *H04L 63/1408* (2013.01); *H04L 63/1416* (2013.01); *H04L 63/1425* (2013.01)

(58) Field of Classification Search
CPC ..... H04L 9/0852; H04L 9/002; H04L 9/0858; G06N 10/00; H04B 10/70
See application file for complete search history.

(56) References Cited

U.S. PATENT DOCUMENTS

| | | | | |
|---|---|---|---|---|
| 10,103,818 | B2 * | 10/2018 | Murakami | ............. H04B 10/70 |
| 10,565,514 | B2 * | 2/2020 | La Cour | ................ G06N 10/00 |

* cited by examiner

*Primary Examiner* — Hee K Song

(57) ABSTRACT

A quantum-computing threats surveillance system for use in quantum communication environments is a quantum-surveillance technology which detects quantum computing threats based on free electron monitoring and entangled state measurement, and performs time-and-space analysis on quantum communication environments via making use of specific Fourier transforms, and then collaborate with a system of Lotka-Volterra competition models for variance analysis, so as to determine whether there is suspicious or potential quantum computing in a quantum communication environment. Furthermore, it can monitor different quantum-teleportation channels to achieve the effect of tracking specific quantum-computing behaviors for a long term.

19 Claims, 19 Drawing Sheets

QUANTUM-COMPUTING THREATS SURVEILLANCE SYSTEM AND METHOD FOR USE IN QUANTUM COMMUNICATION ENVIRONMENTS

BACKGROUND OF THE INVENTION

1. Field of the Invention

The present invention relates to a quantum-computing threats surveillance system and method for quantum-attack resistance, and in particular, to a quantum-computing threats surveillance system and its corresponding methods relating to implementation of applications, solutions, and state-of-the-arts; wherein the system and methods are for use in quantum communication environments, implemented with technologies of free-electron monitoring, entangled-state measurement, decoherenced-state verification, Fourier transforms for time-and-space analysis, dynamic-model evaluation, local hidden-variable analysis, and quantum information maintenance; thereby the present invention can provide a quantum-computing threats surveillance system and method for various quantum teleportation channels, so as to trace suspicious history logs to perform quantum behavior analysis for locking on specific quantum-computing threats.

2. Description of the Related Art

At present, the conventional quantum-cyber-security technology mainly focuses on the field of QKD (Quantum Key Distribution) or PQC (Post-quantum Cryptography). It is not only implemented with high cost to end-users, but the prior art of QKD and PQC usually can only defend against specific known or active quantum-computing attacks individually while it neither supports detection of most of general quantum-computing threats instantly or earlier, nor provides early alerts and instant responding actions. For most of such cases, the prior art of quantum-cyber security fails to trace cyber threats in quantum communication environments, and fails to control the potential quantum cyber risks, either. Thus, the conventional technology still lacks a surveillance system for monitoring and tracing quantum-computing threats in the field of quantum cyber security.

BRIEF SUMMARY OF THE INVENTION

In view of the drawbacks of the prior art, it is an object of the present invention to provide a surveillance system with cyber security solutions for use in quantum communication environments to monitor and trace quantum-computing threats. If it can monitor and trace quantum-computing threats in various quantum-teleportation channels, the alerts and responses of quantum cyber security can be effectively enhanced. This technology can be implemented in a combination of electronic devices, systems, and cloud solutions, and can be adopted in a server room and used to protect most of quantum communication environments. Meanwhile, it effectively covers the insufficiency of the schemes in the field of current PQC or QKD related technologies and solves the problem that the prior quantum cyber security mechanism lacks the ability of tracing possible quantum-computing threats.

To achieve the above objects and more, the present invention provides a combination of electronic apparatuses, sub-systems, and a cloud platform to implement the quantum-computing threats surveillance system for use in quantum communication environments. In an embodiment, the present invention includes: a first sub-system which monitors free electrons to determine abnormal events first and then observes decoherenced states for labeling an abnormal event to be further analyzed; and a second sub-system for entanglement measures within current quantum communication environments to evaluate whether the entangled states are not stable enough, so as to escalate the warning status for a system administrator and collaborate with a secure action to stabilize the current quantum communication if necessary.

Referring to a role of a surveillance system for a receiver in a quantum communication environment, it is usually a system established in a server room including some sub-systems implemented as different VMs (virtual machine) in a cloud platform which collaborates with specific apparatuses for monitoring the current quantum communication status. For some advanced requirements, the system can further implement more sub-systems to analyze possible suspicious cases for escalating alerts with various levels, enabling responding actions, and tracing history logs for locking onto specific quantum threats. Hence, as a security implementation, the related sub-systems should be working together in the embodiments of the present invention, and the elements in each sub-system may be leveraged across different sub-systems (the inter-operation will be illustrated in the following descriptions). Thus, an embodiment based on the above consideration is to implement the related sub-systems as a quantum cyber security service operating on a plurality of VMs working with required apparatuses for use in free electron detecting, atomic probing, and radio wave sensing, and the apparatuses are located in a space for transceivers of quantum communication and the system adopts SDN (software definition network) as the network infrastructure for internal communications.

In an embodiment, in order to monitor free electrons and decoherenced states for labeling abnormal events to be further analyzed, the first sub-system at least comprises: an environment-pre-checking module, a decoherence monitoring unit, and a system-environment patterning module. Wherein, the environment-pre-checking module can collaborate with apparatuses which help to capture free electrons escaped from the optical path of the quantum communication environment, and then labels abnormal events via analyzing captured free electrons in a specific duration; the decoherence monitoring unit labels abnormal events via monitoring decoherenced states in a specific duration; and the system-environment patterning module parameterizes the related system environments as a suspicious event when an abnormal event is determined to be escalated. In this embodiment, for monitoring decoherenced states in a practical way, the decoherence monitoring unit of the first sub-system further includes a set of loadable instructions with coded algorithms stored in non-volatile rewriteable memory for performing the following subroutines step by step: 1) a subroutine for performing Hermitian operation on $M_o$, a matrix of observed quantum states, to derive another matrix $M_h$; 2) a subroutine for performing conjugate-transpose operation to verify whether the matrix $M_h$ is a Hermitian matrix; and 3) a subroutine for deriving bases in a Hilbert space according to $M_o$, the matrix of observed quantum states, to confirm that the current quantum states are still mapped to Hilbert space stably. If there is any failure with the above subroutines, the decoherence monitoring unit will treat the observed states as possible decoherenced states. Implementing a set of loadable instructions with coded algorithms stored in non-volatile rewriteable memory for performing the specific combination of the above three subroutines step by step can provide an effect of determining whether a set of quantum states is decoherenced. This is an effect that the prior art cannot achieve.

In order to confirm whether the current quantum communication is actually impacted when a suspicious event occurs, the system provides a second sub-system which will be triggered due to the suspicious event detected by the first sub-system with patterned parameters of the system environments. Wherein, the second sub-system is for applying entanglement measuring procedures to evaluate whether the entangled states for quantum communication are not stable enough, so as to escalate the warning status for a system administrator. In this embodiment, the second sub-system provides the following components for required procedures and operations: an entanglement-measures mapping module which performs a procedure to map a set of entanglement measures to positive real numbers via making use of a density operator; an entanglement-measures filtering module which performs a procedure to discard the cases that the mapping result of entanglement measures is zero; an entanglement-measures reducing module for performing a procedure which reduces the mapped entanglement measures to von-Neumann entropy; and an LOCC (Local Operations and Classical Communication) operation module which performs operations of LOCC on the reduced measures from the entanglement-measures reducing module so as to confirm whether the current entangled states are not stable enough. Furthermore, based on the result of the above procedures and operations, the LOCC operation module collaborates with an eavesdropping filter process which verifies whether the received state violates current QKD (Quantum Key Distribution) protocol in communication and checks whether there is quantum interference issue with current qubit states, so as to discard the states decoherenced by quantum eavesdropping behavior first, and then prepares hyper-entangled states for collaborating with a security communication unit to secure and stabilize current quantum communication via making use of QSDC (quantum secure direct communication) protocol.

Referring to the same embodiment, combining these elements in an implementation of software, hardware, or a combination of software and hardware into a quantum-communication-monitor sub-system and an entanglement-measures sub-system not only can effectively label suspicious events which actually impact the quality of quantum communication, but also provides instant alerts and responding actions for such suspicious events in time as a role of a surveillance system for quantum communication environments. This is an effect that cannot be achieved by conventional technology.

In an embodiment, in order to have an efficient performance index in analyzing and capturing free electrons, the present invention provides three key devices as required apparatuses to monitor specific free electrons for the quantum communication environments. In this embodiment, the environment-pre-checking module of the first sub-system shall collaborate with the following three kinds of devices: 1) a device making use of differential energy spectrum or integrated spectrum for detecting Auger electrons from the surface of transmission media which is an optical path for single photons (such as an optical waveguide), in order to monitor an abnormal event which is caused by an external light source in the environment of quantum communication, wherein the external optical frequency is equal to or higher than EUV; 2) a device for detecting spin-Hall effect caused by extrinsic spin-orbit coupling via making use of voltage measurement on free electrons outside the surface of transmission media wherein the transmission media is an optical path for single photons (such as an optical waveguide) so as to confirm that in the quantum communication environment exists a meaningful external impact on local potential energy and the impact may be caused by a visible light source; and 3) a device which probes and scans closely the surface of transmission media where the transmission media is an optical path for single photons (such as an optical waveguide) for detecting free electrons caused by a quantum tunneling effect so as to confirm that in the quantum communication environment exists a meaningful change on local system kinetic energy and that the change may be caused by a light source, wherein the optical frequency of the light source is equal to or lower than infrared light. After detecting the above-mentioned specific free electrons, the three kinds of devices will derive probability distribution data of the detected free electrons for the environment-pre-checking module so that the environment-pre-checking module can help to determine whether there is an abnormal event.

Referring to the same embodiment, combining the above three devices in an implementation of software, hardware, or a combination of software and hardware into a quantum-communication-monitor sub-system for collaborating with an environment-pre-checking module, it not only can effectively make the system focus on monitoring specific free electrons for event categorization, but also facilitates meaningful analysis on the observations which could actually relate to risky quantum-computing threats. This is an effect that cannot be achieved by conventional technology.

In an embodiment, in order to confirm whether a suspicious event should be treated as a quantum-computing threat, the system further comprises a third sub-system for performing specific Fourier transform processes to analyze whether the variation of potential energy and the relation of time-and-frequency is reasonable; and a fourth sub-system which applies a Lotka-Volterra equation module with Lotka-Volterra competition models to determine a suspicious event via evaluation of Lorentz invariant in a specific duration, and then performs analysis on time and space to determine whether the suspicious event should be escalated to an advanced threat level so as to trigger a risk alert. The third sub-system for this surveillance system at least comprises: a position-and-momentum transformation module making use of position-and-momentum Fourier transform to analyze scientific rationality of the observation derived from captured free electrons; and a time-and-frequency transformation module making use of time-and-frequency Fourier transform to analyze scientific rationality of the observation derived from decoherenced quantum states. If there is any unreasonable observation determined by the third sub-system, it will trigger the fourth sub-system which applies analysis based on Lotka-Volterra competition models and comprises: a Lotka-Volterra competition model mapping unit which conducts competitive Lotka-Volterra equations (such as:

$$\frac{dx_1}{dt} = r_1 x_1 \left(1 - \left(\frac{x_1 + \alpha_{12} x_2}{K_1}\right)\right) \quad \frac{dx_2}{dt} = r_2 x_2 \left(1 - \left(\frac{x_2 + \alpha_{21} x_1}{K_2}\right)\right)$$ )

on the observations to perform a mapping process between an initial state and a final state from a dynamical-system point of view; and a Lorentz-invariant verification unit which verifies that there is no Lorentz invariant existing in the spacetime of the Lorentz transform within a specific duration across the mapping process. Once the Lorentz-invariant verification unit determines that there is no Lorentz invariant existing in a specific observed duration according to the analysis on the variation of time-space between observed initial state and observed final state, that means the elements of the observations cannot be expressed by a trivial representation since there is an element that failed to be mapped to a zero vector (one-dimensional linear mapping). It implies that some element(s) of the observation has been degenerated due to some impact of an external effect which may relate to quantum-computing threats that caused the unreasonable variation.

Referring to the same embodiment, combining these elements in an implementation of software, hardware, or a combination of software and hardware into a Fourier-transforms-analysis sub-system and a dynamic-model-evaluation sub-system, it not only can effectively determine the scientific rationality of the observed variation for a suspicious event, but also facilitates determination of whether the suspicious event should be treated as a quantum-computing threat since some element(s) of the observations has been degenerated due to an external impact. This is an effect that cannot be achieved by conventional technology.

In an embodiment, in order to verify the scientific rationality based on the observations of captured free electrons via a set of practical processes and then make suitable decisions for the result of verification, the third sub-system not only drives the position-and-momentum transformation module to perform the position-and-momentum Fourier transform on the observations of captured free electrons, but further comprises: a spectral analysis unit, a basis resolution unit, an uncertainty-principle verification unit, a block-list unit, and a wave-function database unit. Wherein, the spectral analysis unit performs spectral analysis processes on the result of the position-and-momentum Fourier transform for the observations of captured free electrons to confirm whether there is a possible quantum harmonic oscillator within the observations so as to derive a linear combination of quantum harmonic oscillators; the basis resolution unit performs a basis resolution process for resolving the derived linear combination of quantum harmonic oscillators to derive corresponding bases; and the uncertainty-principle verification unit performs an uncertainty-principle verification process to verify whether the result of the position-and-momentum Fourier transform for the observations of captured free electrons fits the uncertainty principle. Once the uncertainty-principle verification unit determines that the result of the position-and-momentum Fourier transform fits the uncertainty principle and the bases can be derived by the basis resolution unit successfully, the block-list unit will add the bases into a block list so that the system can help to block such suspicious quantum communication in the future. Moreover, the wave-function database unit stores wave functions expressed by the corresponding linear combination of quantum harmonic oscillators into a database so that the system will be able to perform further analysis and tracing policies in the future.

Referring to the same embodiment, combining these elements in software, hardware, or a combination of software and hardware into a Fourier-transforms-analysis sub-system, it not only can effectively facilitate analysis of the abnormal variation of potential energy based on the observation of captured free electrons so as to determine whether the analyzed event is a suspicious event, but also facilitates future policies and analyses. This is an effect that cannot be achieved by conventional technology.

Further, in an embodiment, in order to verify the scientific rationality based on the observations derived from decoherenced quantum states via a set of practical processes and then make suitable decisions for the result of verification, the third sub-system not only drives the time-and-frequency transformation module to perform the time-and-frequency Fourier transform on the observations derived from decoherenced quantum states, but further comprises: a temperature-controller unit, an optical-interference resistant unit, a ZPE (zero-point energy) analysis unit, a covariance-and-correlation analysis unit, and a true-randomness analysis unit. Wherein, the temperature-controller unit and the optical-interference resistant unit collaborate in a decoherence measurement process so as to confirm that the current abnormal observations of decoherenced states are not caused by temperature or optical interference factors. Thereafter, according to the result of the time-and-frequency Fourier transform on the observations of decoherenced states, the ZPE analysis unit performs a ZPE analysis process for confirming that the expected value of the current abnormal observations on decoherenced states are not closed to the expected value of ZPE. Once the ZPE analysis unit determines the above two expected values are significant closed to each other based on a reasonable confidence level, that implies the current abnormal decoherenced observations are caused by ZPE factors, the third sub-system will by-pass the analyzed event directly. Otherwise, the covariance-and-correlation analysis unit collaborates with a true-randomness analysis unit to perform a covariance-and-correlation analysis process which includes a set of subroutines on the result of time-and-frequency Fourier transform on the observations of decoherenced states, so as to confirm that the current abnormal observations are not caused by factors of the local quantum communication environment. Wherein, the true-randomness analysis unit usually collaborates with a quantum random number generator for calibration first, and then performs a true-randomness analysis process on the observations of decoherenced states for determining whether the current abnormal observations are in randomness. Once the covariance-and-correlation analysis unit determines that the current abnormal observations of decoherenced states are not in randomness nor caused by factors of the local quantum communication environment, the third sub-system will be able to treat the abnormal event as a suspicious event.

Thereby, the third sub-system as a Fourier-transforms-analysis sub-system can efficiently drive the position-and-momentum transformation module and the time-and-frequency transformation module to determine a suspicious event which triggers further risky analysis performed by the fourth sub-system. Referring to the same embodiments, combining these elements in software, hardware, or a combination of software and hardware into a Fourier-transforms-analysis sub-system, it not only can effectively facilitate analysis of the abnormal observations of free electrons and decoherenced states so as to determine whether the analyzed event is a suspicious event, but also helps to classify the abnormal observations of decoherenced states. Since an abnormal observation of decoherenced states may be caused by a regular factor such as a local quantum communication environment issue, it is important to identify and classify the observed decoherenced states so as to suppress false alerts for a surveillance system. This is an effect that cannot be achieved by conventional technology.

In an embodiment, in order to verify a possible quantum-computing threat, the fourth sub-system further comprises the following units to collaborate with the Lotka-Volterra equation module of the fourth sub-system: a universe-variability analysis unit, a gravity-anomaly analysis unit, and a ripple-in-spacetime detection unit. Wherein, when the Lorentz-invariant verification unit of the fourth sub-system determines that there is no Lorentz invariant existing in a specific duration of observation, the universe-variability analysis unit performs a universe-variability analysis process so as to confirm whether the current quantum communication environment is impacted by factors of space curve, space collapse, or space singularity. Meanwhile, the gravitational-redshift analysis unit performs a gravitational-redshift analysis process so as to confirm whether the current quantum communication environment is impacted by factors of gravity anomaly. Besides, the ripple-in-spacetime detection unit performs a gravity-wave analysis process including a set of subroutines so as to confirm whether the current quantum communication environment is impacted by factors of gravity waves.

In an embodiment, in order to verify a possible quantum-computing threat, a Lotka-Volterra equation module applied by the fourth sub-system for analysis based on dynamic models shall collaborate with a local-hidden-variables analysis unit to determine that there is a time related impact factor on observed decoherenced states so as to collaborate with a C.S.C.O. (complete set of commuting observables) operation module for quantum information recovery, wherein the Lotka-Volterra equation module further comprises: a time-dilation analysis unit, a T-symmetry detection unit, and a ripple-in-spacetime detection unit. Wherein, when the Lorentz-invariant verification unit of the fourth sub-system determines that there is no Lorentz invariant existing in a specific duration of observation, the time-dilation analysis unit performs a time-dilation analysis process, so as to confirm whether the current quantum communication environment is impacted by factors of time dilation. Meanwhile, the T-symmetry detection unit performs a time-symmetry analysis process, so as to confirm whether there is time reversal invariance in the current quantum communication environment under the condition of discarding the effect of system friction. Besides, the ripple-in-spacetime detection unit conducts Lorentz transformation in consideration of the principle of relativity which prevents the distortion of the observed information first, and then performs a gravity-wave analysis process which applies optical atomic clock related technology and includes a set of subroutines with coded algorithms so as to confirm whether the current quantum communication environment is impacted by factors of gravity waves.

In some embodiments, in order to trace possible quantum-computing threats in quantum communication environments, the system further comprises a fifth sub-system for performing quantum-teleportation analysis processes to label various teleportation channels, and a sixth sub-system for logging and analyzing history threats. To achieve the above effects, the fifth sub-system at least comprises: a Bell-measurements analysis unit for performing Bell-measurements analysis processes which confirm that the observation violates local realism first in order to assure that the current observation is entanglement, and then find the cases that the received quantum state is not in maximum entanglement; and a local-hidden-variables analysis unit for performing a local-hidden-variables analysis process via making use of Gisin's theorem within the impacted local quantum communication environment and POVM (positive operator-valued measure) operation on all of possible entangled states, so as to label and pattern the local hidden variables. That means the fifth sub-system shall label an analyzed event when the received entangled states violate local realism but the entangled states are not in maximum entanglement. Since all of the possible entangled states derived with Gisin's theorem implies disclosing all possible observed types of predictions regarding the future behavior of the system which lacks maximum entanglement in the condition of violating local realism, it is reasonable to the surveillance system to treat the possible entangled states in the form of POVM as a pattern related to the local hidden variables. In the present invention, it defines such an event that implies there is some unusual hidden variable within the local quantum communication environment which is worth logging the analyzed states as a pattern of hidden variable for identifying a specific quantum teleportation channel related to some quantum-computing threat.

In the same embodiments, once the fifth sub-system determines that the current event should be logged, it will trigger the sixth sub-system for tracing history logs, and the sixth sub-system at least comprises: an event-alert module, a quantum communication blocking module, a key recycling module, a history-logs classification module, and a behavior analysis module. Wherein, the event-alert module provides alerts for possible quantum-computing threats or quantum communication quality events. Thereafter, the quantum communication blocking module determines whether to break a quantum communication according to corresponding escalation levels. Meanwhile, the key recycling module determines whether to enable a key-recycling process according to an observed attacking cycle of some quantum-computing threat. Besides, the history-logs classification module classifies the event data stored in the history logs, and the behavior analysis module performs behavior analysis on the possible quantum-computing threats for finding the periodicity of the alerted events, analyzing common bases of quantum states from a bunch of history events, and performing analysis on entanglement measures.

Referring to the same embodiments, combining these elements in software, hardware, or a combination of software and hardware into a quantum-teleportation analysis module for the fifth sub-system and a set of log-and-trace services as the sixth sub-system, it not only can effectively facilitate identification of a risky quantum-teleportation channel, but also helps to log the related quantum-computing threats for required responses and further analysis so as to lock on a quantum-computing threat in a practical way. This is an effect that cannot be achieved by conventional technology.

In an embodiment, in order to perform suitable actions on impacted quantum information, the system further comprises a seventh sub-system for performing information recovery processes to recover impacted quantum information or qubits caused by factors of time-dilation, time-asymmetry, or ripple-in-spacetime. To achieve such effect, the seventh sub-system collaborates with an optical-interference resistant unit and at least comprises: a photon capture-and-storage module, a prototype-quantum-node recovery module, and a C.S.C.O. (complete set of commuting observables) operation module. Wherein, the photon capture-and-storage module facilitates capturing and storing photons at least for milliseconds via controlling a prototype-quantum-node recovery module. Meanwhile, the prototype-quantum-node recovery module provides the ability to catch, store, and re-entangle bits of quantum information for correction of signal loss. Besides, the C.S.C.O. operation module performs processes for making use of C.S.C.O. to recover degenerated quantum information or qubits, wherein the processes mainly include the following subroutines: 1) a subroutine for performing non-orthogonal conversion on the observed quantum states to derive eigen states on an orthogonal coordinate system first; 2) a subroutine for validating whether a Hermitian transform is applicable for the derived eigen states; 3) a subroutine which performs phase correction on the derived eigen states to confirm there is still a degenerated state, and then verifies the dimension of the observed state so as to perform a matrix operation for making use of C.S.C.O. to recover the degenerated state if the above-mentioned Hermitian transform is applicable, and then gets a recovered completed result for maintaining the completeness of the received quantum states; and finally; 4) a subroutine to determine the analyzed event as a quantum-computing threat directly once the above subroutines have failed to recover the degenerated quantum state in a reasonable duration.

Referring to the same embodiments, combining these elements in software, hardware, or a combination of software and hardware into a quality service for current quantum communication as the seventh sub-system, it not only can effectively maintain the quality of quantum transmission via optical paths, but also helps to recover the degenerated quantum states. This is an effect that cannot be achieved by conventional technology.

In addition, in some embodiments, in order to efficiently classify a specific quantum-computing threat which relates to factors of ripple in spacetime, once the position-and-momentum transformation module of the third sub-system determines that there is a suspicious event, the third sub-system will collaborate with the decoherence monitoring unit of the first sub-system to confirm that there is not only space-time variation but also abnormal decoherenced states in the current quantum communication environment, and then collaborates with a ripple-in-spacetime detection unit of the fourth sub-system to perform gravity-wave analysis process on a variation of optical frequency and a variation of time dilation via making use of optical atomic clocks, so as to determine whether the local quantum communication environment is impacted by factors of gravity waves.

However, in the same embodiments, if the ripple-in-spacetime detection unit has failed to determine that the local quantum communication environment is impacted by factors of spacetime variation, the third sub-system will trigger the time-and-frequency transformation module to determine whether the current abnormal decoherenced states also involve space-time related factors and whether the third sub-system should collaborate with a set of subroutines with algorithms for performing C.S.C.O. operations on the decoherenced states for quantum information recovery, and collaborates with a security communication unit to secure and stabilize current quantum communication via making use of QSDC (quantum secure direct communication) protocol if necessary.

Thereby, the above embodiments of the present invention support to implement a surveillance system for use in quantum communication environments to resist quantum-computing threats in various quantum-teleportation channels. The present invention provides a complete architecture of quantum-computing threat resistance for general quantum communication environments. This technology can be implemented on a transceiver or a cloud service platform meanwhile collaborates with apparatuses for capturing and monitoring specific free electrons outside the surface of transmission media for various light sources wherein the transmission media is an optical path for single photons (such as an optical waveguide). In some embodiments, this technology not only detects and blocks quantum-computing threats, but also optionally implements basic or advanced counterattacking modules. In addition, the relevant technical means of this system can be practiced by devices working in general environments, and also provides several effects of a quantum cyber-security mechanism that cannot be supported by the current PQC or QKD schemes for use in quantum communication, for example, a sub-system for supporting event alerts and history logs, and a proprietary database of patterns, so as to facilitate a 24/7 security communication service.

DETAILED DESCRIPTION OF THE INVENTION

Figure 1A:
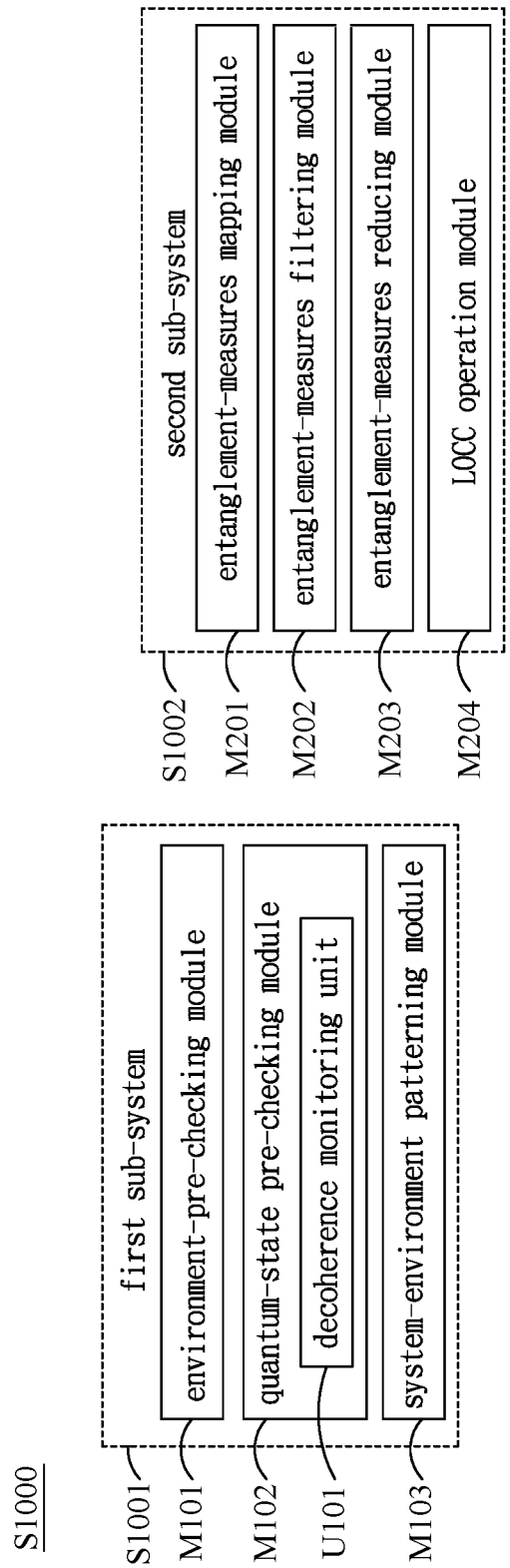
FIG. 1A is a structural block diagram of a system according to an embodiment of the present invention.
Figure 1B:
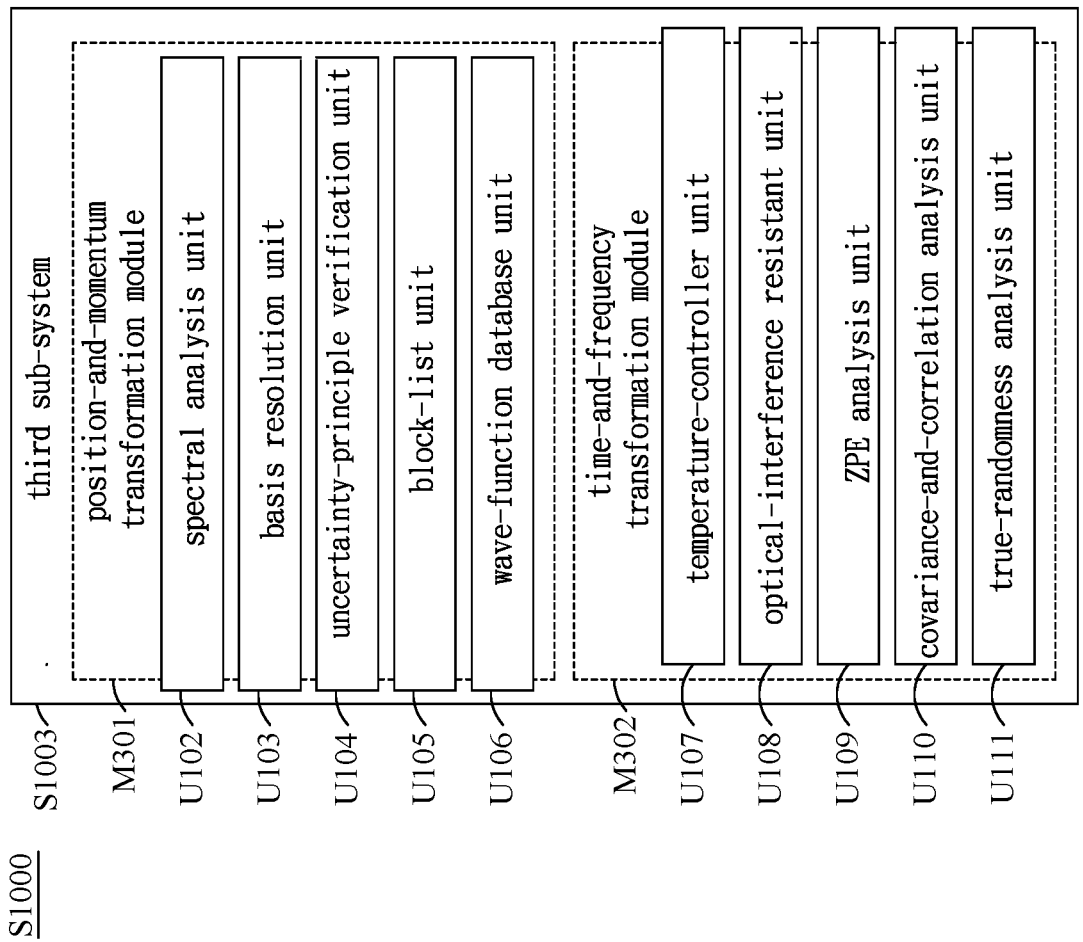
FIG. 1B is a structural block diagram of a system according to an embodiment of the present invention.
Figure 1C:
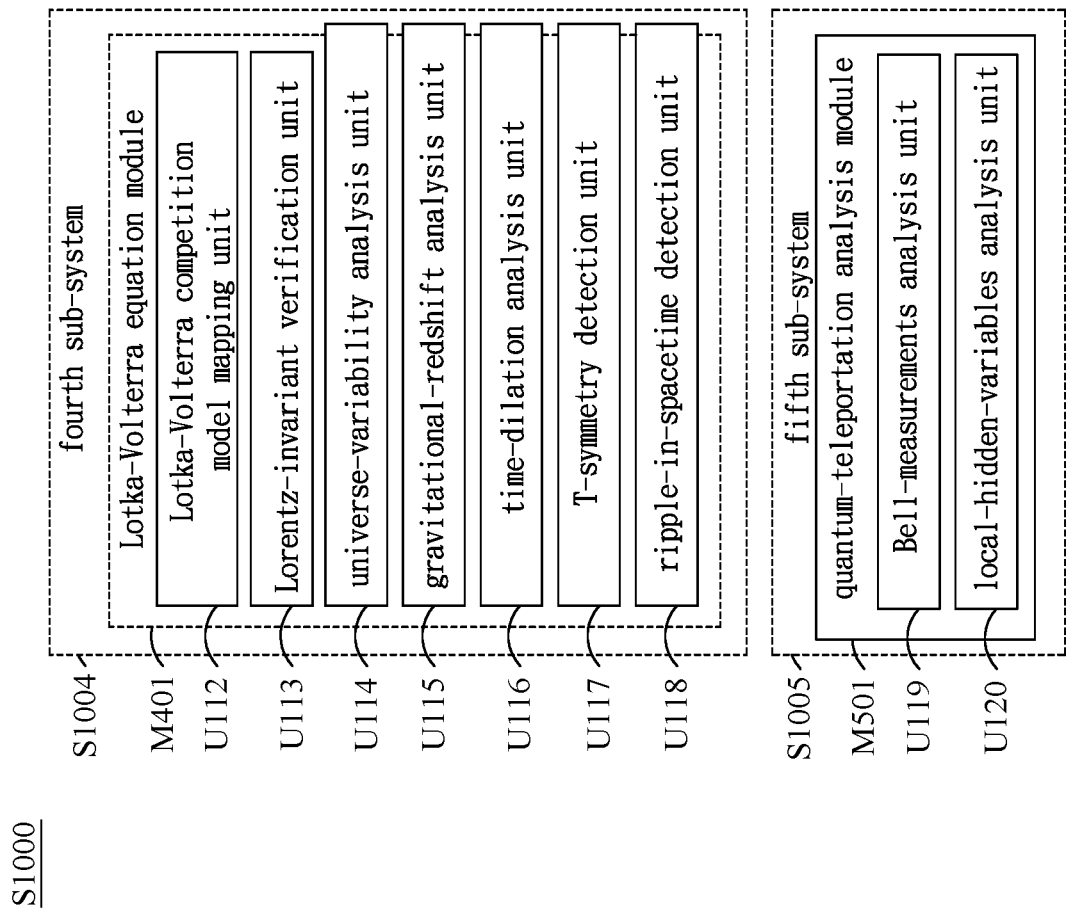
FIG. 1C is a structural block diagram of a system according to an embodiment of the present invention.

To facilitate understanding of the objects, characteristics and effects of this present disclosure, embodiments together with the attached drawings for the detailed description of the present disclosure are provided.

Based on a quantum-computing threats surveillance method, a plurality of embodiments in regard to a quantum-computing threats surveillance system for use in quantum communication environments which is capable of resisting quantum-computing threats in various quantum-teleportation channels are provided as follows. In an embodiment of this aspect, the system can be further implemented in a combination of electronic devices, systems, and cloud solutions, and can be adopted in a server room and used to protect most of quantum communication environments.

Refer to FIGS. 1A-1D, which are structural block diagrams of a system according to an embodiment of the present invention. A full solution of the quantum-computing threats surveillance system for use in quantum communication environments S1000 includes a first sub-system S1001, a second sub-system S1002, a third sub-system S1003, a fourth sub-system S1004, a fifth sub-system S1005, a sixth sub-system S1006, and a seventh sub-system S1007. In most of the embodiments of the present invention, the first sub-system S1001 can be implemented as a quantum-communication-monitor sub-system by means of an environment-pre-checking module and means of a quantum-state pre-checking module; the second sub-system S1002 can be implemented as an entanglement-measures sub-system by means of entanglement measurements and means of LOCC (local operations and classical communication), wherein the means implemented for the second sub-system S1002 work with the following technical features: stabilization for entanglement, retransmission for teleportation failures, error correction for entanglement, threat detection for double-CNOT attacks, and fault tolerance under a collective noise channel; the third sub-system S1003 can be implemented as a Fourier-transforms-analysis sub-system by means of analysis with Fourier transforms; the fourth sub-system S1004 can be implemented as a dynamic-model-evaluation sub-system by means of dynamic-model evaluation and means of Lorentz-invariant verification; the fifth sub-system S1005 can be implemented as a sub-system via technology of Bell measurement and means of local-hidden-variables analysis, wherein the fifth sub-system comprises a quantum-teleportation analysis module M501; the sixth sub-system S1006 can be implemented as a sub-system providing log-and-trace services, and the seventh sub-system S1007 can be implemented as a sub-system supporting quality services for current quantum communication.

For example, as shown in FIGS. 1A-1D, the first sub-system S1001 monitors free electrons or decoherenced states to label suspicious cases; the second sub-system S1002 performs entanglement measures within current quantum communication environments to evaluate whether the entangled states are not stable enough; the third sub-system S1003 performs specific Fourier transform processes to analyze whether the variation of potential energy and the relation of time-and-frequency is reasonable; the fourth sub-system S1004 applies a Lotka-Volterra equation module for analyzing space and time with Lotka-Volterra competition models to evaluate whether a suspicious event should be escalated to an advanced threat level for a system administrator; the fifth sub-system S1005 performs quantum-teleportation analysis processes to label various teleportation channels for risky communications; the sixth sub-system S1006 logs and analyzes history threats; and the seventh sub-system S1007 performs information recovery processes to recover impacted quantum information or Qubits caused by factors of time-dilation, time-asymmetry, or ripple-in-spacetime.

Figure 1D:
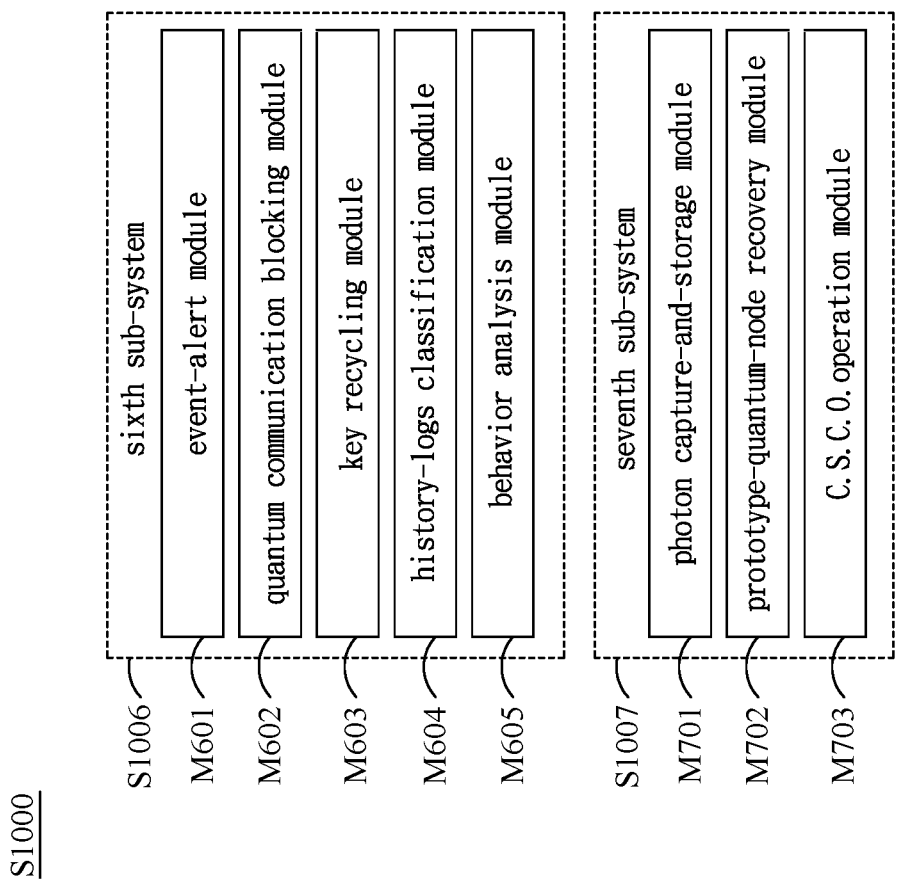
FIG. 1D is a structural block diagram of a system according to an embodiment of the present invention.
Figure 1E:
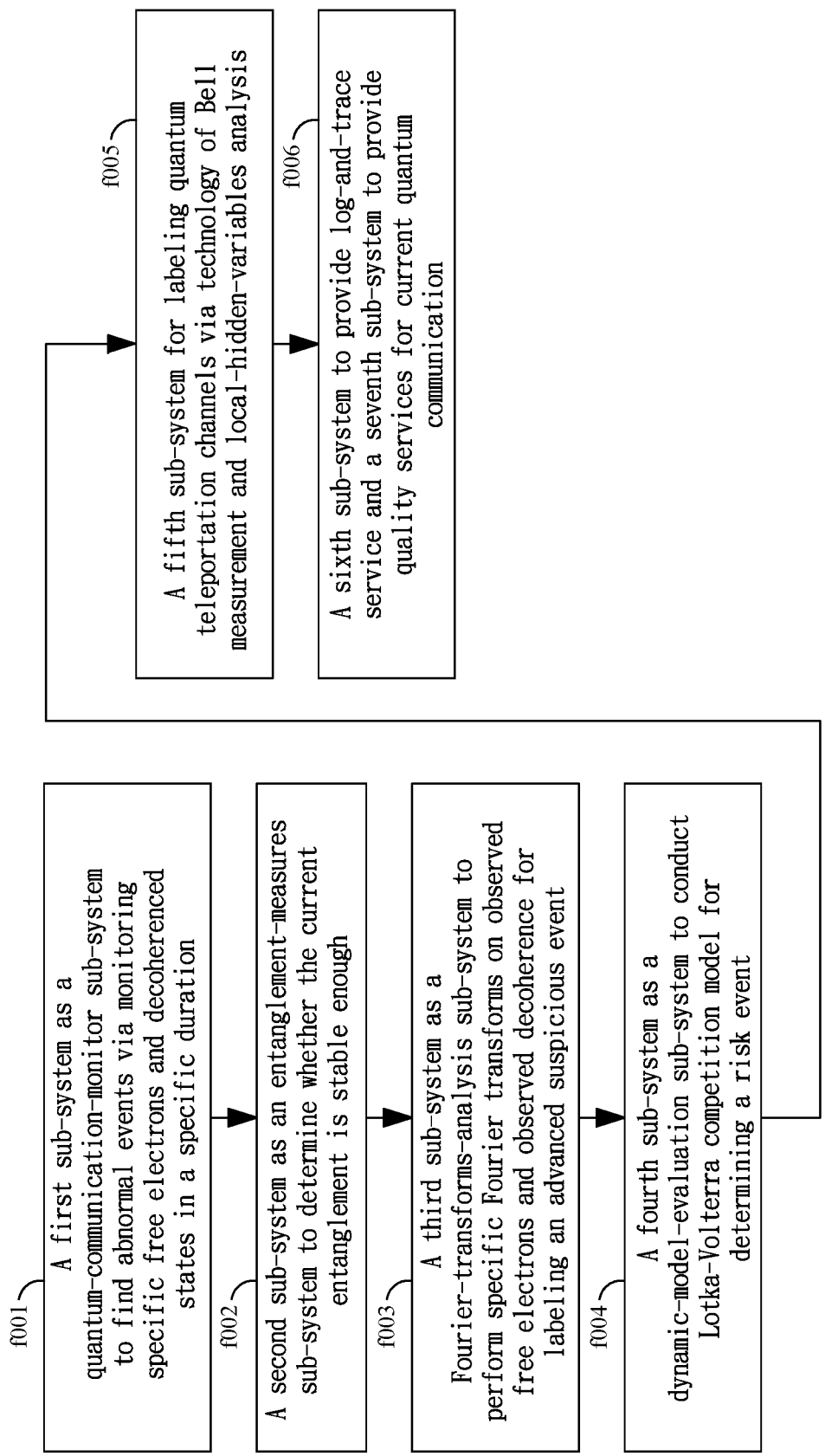
FIG. 1E is a block diagram of a system related to FIGS. 1A-1D.

In brief, referring to FIG. 1D, a main workflow for an implementation of this invention is shown as f001~f006 for summarizing the stages of the above-mentioned sub-systems: 1) shown as f001, a first sub-system as a quantum-communication-monitor sub-system to find abnormal events via monitoring specific free electrons and decoherenced states in a specific duration; 2) shown as f002, a second sub-system as an entanglement-measures sub-system to determine whether the current entanglement is stable enough; 3) shown as f003, a third sub-system as a Fourier-transforms-analysis sub-system to perform specific Fourier transforms on observed free electrons and observed decoherence for labeling an advanced suspicious event; 4) shown as f004, a fourth sub-system as a dynamic-model-evaluation sub-system to conduct Lotka-Volterra competition model for determining a risk event; 5) shown as f005, a fifth sub-system for labeling quantum teleportation channels via technology of Bell measurement and local-hidden-variables analysis; and 6) shown as f006, a sixth sub-system to provide log-and-trace services and a seventh sub-system to provide quality services for current quantum communication.

Figure 2A:
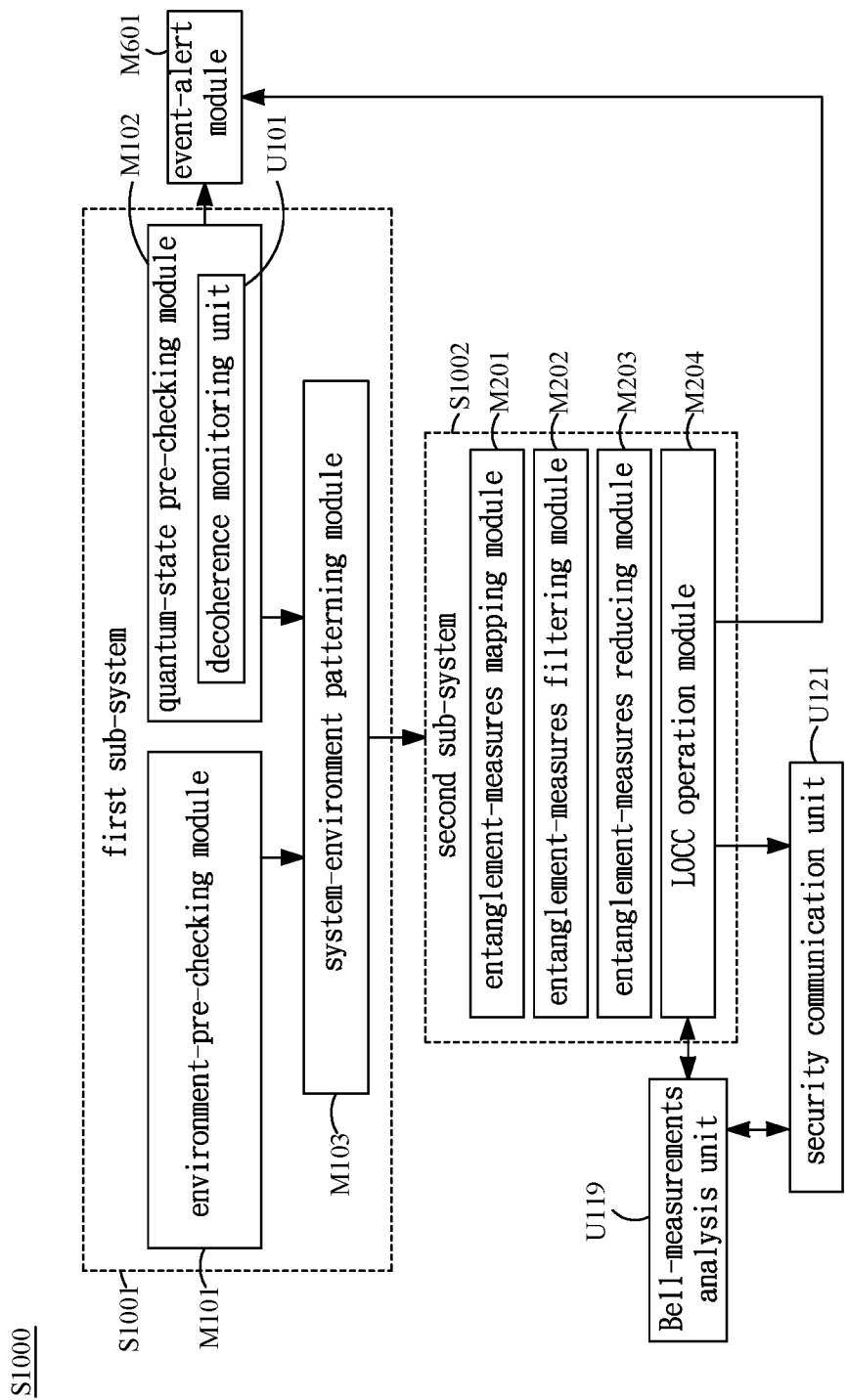
FIG. 2A is a structural block diagram of the first and second sub-systems according to an embodiment of the present invention.
Figure 2B:
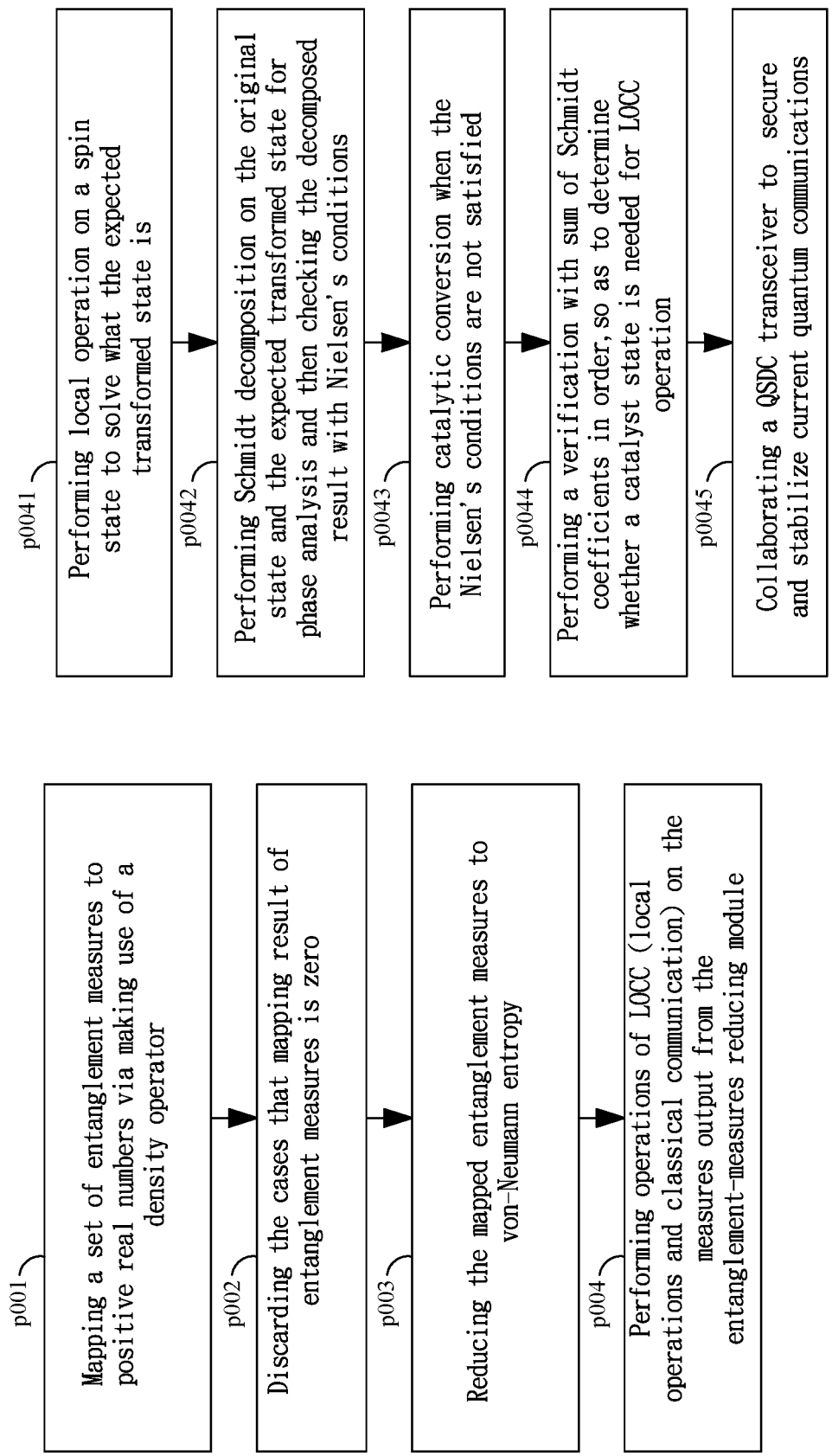
FIG. 2B is a block diagram of the second sub-system related to FIG. 2A.
Figure 2C:
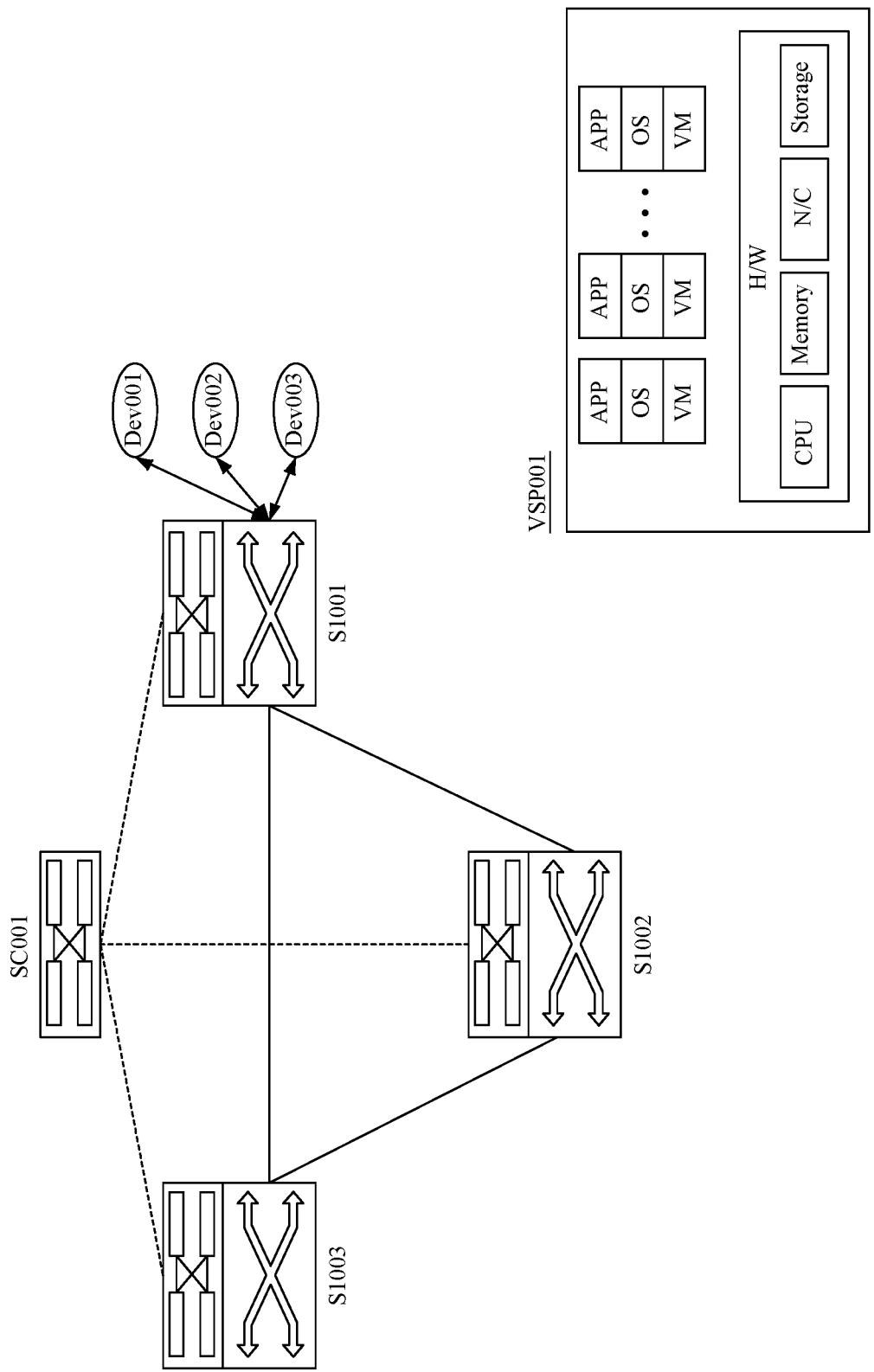
FIG. 2C is a schematic diagram of the system according to a user scenario of the present invention.

Referring to FIG. 2C for example, as a role of a surveillance system for a transceiver node in a quantum communication environment, it is usually a system established as a virtualized service platform VSP001 in a server room including some sub-systems (such as S1001~S1003) implemented as different VMs (virtual machines) in a cloud platform VSP001 which collaborates with specific apparatuses (such as Dev001~Dev003) for monitoring the current quantum communication status. For some advanced requirements, the system can further implement more sub-systems to analyze possible suspicious cases for escalating alerts with various levels, enabling responding actions, and tracing history logs for locking on specific quantum threats. Hence, as a security implementation, the related sub-systems should be working together in the embodiments of the present invention, and the elements (could be modules or units) in each sub-system may be leveraged across different sub-systems (the inter-operation will be illustrated in the following descriptions).

In the present disclosure, a module (or a unit) generally means implementations including a set of loadable instructions with coded algorithms stored in non-volatile rewriteable memory (for example, NAND Flash, SSD, and so on) to perform software subroutines, programming logics, or firmware applications, and so on. Thus, an embodiment based on the above consideration is to implement the related sub-systems (S1001~S1003) as a quantum cyber security service VSP001 operating with a plurality of VMs working with required apparatuses for use in free electron detecting, atomic probing, and radio wave sensing. Wherein, the apparatuses are located in a space for transceivers of quantum communication and the system adopts SDN (software definition network) with a software controller SC001 as the network infrastructure for internal communications. Implementing the present invention with the virtualized server platform (VSP), each sub-system can bundle a VM (virtual machine) with specified OS and a set of APP applications individually; here the APP mentioned in the VSP can be software applications, software development libraries, programming codes, etc. In addition, the above embodiments are only feasible examples for illustrating a user scenario of the present invention, and the implementation and deployment of the present invention is not limited thereto.

Further referring to FIG. 2A which is a structural block diagram of the first and second sub-systems according to an embodiment of the present invention, in an embodiment, the present invention at least includes: a first sub-system S1001 for monitoring free electrons and decoherenced states to label suspicious events for further analysis, and a second sub-system S1002 for entanglement measures within current quantum communication environments to evaluate whether the entangled states are not stable enough, so as to escalate the warning status to an event-alert module M601 for a system administrator and collaborate with a security communication unit U121 for taking secure actions to stabilize the current quantum communication if necessarily. Thus, the administrator of this quantum communication surveillance system will be notified that there is a suspicious event with abnormal occurrence of monitored free electrons and decoherenced states which implies the current quantum communication is unstable in entanglement, and the system will enable a security communication mechanism to stabilize the current quantum teleportation.

In this embodiment, the first sub-system S1001 at least comprises: an environment-pre-checking module M101, a decoherence monitoring unit U101, and a system-environment patterning module M103. Wherein, at first, the environment-pre-checking module M101 can collaborate with apparatuses which help to capture free electrons escaped from the optical transmission media of the quantum communication environment, and then labels abnormal events via analyzing captured free electrons in a specific duration to see whether there is abnormal variation on the number of the monitored observations; once there is an abnormal event reported by M101, the decoherence monitoring unit U101 monitors decoherenced states in a specific duration for determining whether to label abnormal events as well; and then the system-environment patterning module M103 parameterizes the related system environments as a suspicious event according to the information from M101 and U101, and determines to escalate a suspicious event for further analysis. In this embodiment, also referring to FIG. 3, the present invention discloses means of quantum-state pre-checking to provide a proprietary filter for suspicious events related to the following cases: events about tampered information, events about variation of optical frequency, events about phase change, events about gravity impacts, and events about variation of electric field or magnetic field. To implement such means of quantum-state pre-checking via monitoring decoherenced states in a practical way, the decoherence monitoring unit U101 of the first sub-system S1001 further includes a set of loadable instructions with coded algorithms stored in non-volatile rewriteable memory for performing the following subroutines (shown as blocks p101~p103) step by step: 1) a subroutine p101 for performing Hermitian operation on $M_o$ which is a matrix of observed quantum states, to derive a matrix $M_h$; 2) a subroutine p102 for performing a conjugate-transpose operation to verify whether the matrix $M_h$ is a Hermitian matrix; and 3) a subroutine p103 for deriving bases in a Hilbert space according to $M_o$ which is the matrix of observed quantum states, to confirm that the current quantum states are still mapped to Hilbert space stably. If there is any failure with any of the above subroutines (p101~p103), the decoherence monitoring unit U101 will treat the observed states as possible decoherenced states. Implementing a set of loadable instructions with coded algorithms stored in non-volatile rewriteable memory for performing the specific combination of these subroutines (p101~p103) step by step can provide an effect of determining whether a set of quantum states is decoherenced. In some specific applications, as shown in FIG. 2A, the decoherence monitoring unit U101 can be enhanced as a quantum-state pre-checking module M102 for a usage of a state filter as well. This is an effect that the prior art cannot achieve.

In the same embodiment, as shown in FIG. 2A, in order to confirm whether the current quantum communication is actually impacted when a suspicious event occurs, by means of entanglement measurements and means of LOCC (local operations and classical communication), the system provides a second sub-system S1002 which will be triggered due to the suspicious event detected by the first sub-system S1001 with patterned parameters of the system environments. Wherein, the second sub-system S1002 is for applying entanglement measuring procedures to evaluate whether the entangled states for quantum communication are not stable enough, so as to escalate warning status to an alert-event module M601 for a system administrator. In this embodiment, referring to FIG. 2A, FIG. 2B, and FIG. 3, the second sub-system S1002 provides the following components for required procedures and operations: an entanglement-measures mapping module M201 which performs a procedure p001 to map a set of entanglement measures to positive real numbers via making use of a density operator (ex:

$$\rho = \sum_i w_i \rho_i^A \otimes \rho_i^B,$$

);

an entanglement-measures filtering module M202 which performs a procedure p002 to discard the cases that the mapping result of entanglement measures is zero (that implies the complex system is not entangled); an entanglement-measures reducing module M203 for performing a procedure p003 which reduces the mapped entanglement measures to von-Neumann entropy (ex:

$$S(\rho) = -\sum_i \omega_i \log \omega_i$$

);

and an LOCC operation module M204 which performs operations p004 of LOCC (local operations and classical communication) on the reduced measures from the entanglement-measures reducing module M203 so as to confirm whether the current entangled states are not stable enough. For more details of the operations performed by the LOCC operation module M204, as shown in FIG. 2A, the LOCC operation module M204 works with a Bell-measurements analysis unit U119 for leveraging tools of Bell-measurements on the operations of LOCC; and as shown in FIG. 2B, the LOCC operation module M204 shall perform the following subroutines (shown as blocks p0041~p0045) for LOCC operations: 1) performing local operation on a spin state to solve what the expected transformed state is; 2) performing Schmidt decomposition on the original state and the expected transformed state for phase analysis and then checking the decomposed result with Nielsen's conditions (Nielsen M. A., 1999 "Conditions for a class of entanglement transformations"); 3) performing catalytic conversion when the Nielsen's conditions are not satisfied; 4) performing a verification with sum of Schmidt coefficients in order, so as to determine whether a catalyst state is needed for LOCC operation; and 5) if the transformed measures (in the form of transformed entropy) is enough larger than the measures before LOCC operations or there is no condition for performing LOCC operations on current entanglement measures, that implies the current entangled states are not stable enough in a complex system. Referring to FIG. 2A, the LOCC operation module M204 of the second sub-system S1002 collaborates with an eavesdropping filter process which verifies whether the received state violates current QKD protocol in communication and checks whether there is a quantum interference issue with current qubit states, so as to discard the states decoherenced by quantum eavesdropping behavior first, and then prepares hyper-entangled states for collaborating with a security communication unit U121 to secure and stabilize current quantum communications via making use of QSDC (quantum secure direct communication) protocol.

Referring to the same embodiment, combining these elements in an implementation of software, hardware, or a combination of software and hardware into a first sub-system S1001 as a quantum-communication-monitor sub-system and a second sub-system S1002 as an entanglement-measures sub-system, not only can effectively label suspicious events which actually impact the current quantum communication, but also provides instant alerts and responding actions for such events in time as a role of a surveillance system for quantum communication environments. This is an effect that cannot be achieved by conventional technology.

Figure 3:
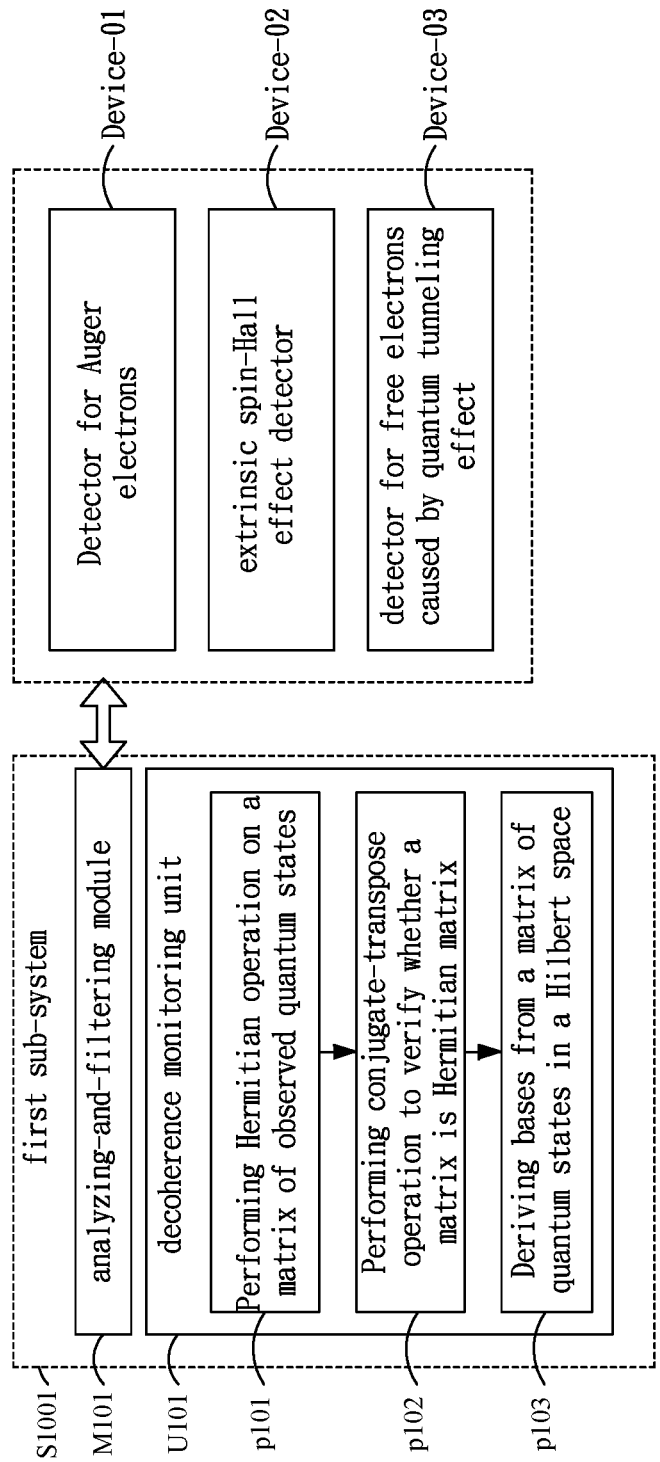
FIG. 3 is a schematic diagram of the first sub-system according to an embodiment of the present invention.

Referring to FIG. 3, in an embodiment, in order to have an efficient performance index in analyzing and capturing free electrons, by means of environment-pre-checking, the present invention provides three key devices as required apparatuses to monitor specific free electrons for the quantum communication environments. In this embodiment, the environment-pre-checking module M101 of the first sub-system S1001 shall collaborate with the following three kinds of devices (Device-01~Device-03): 1) a device Device-01 for detecting Auger electrons from the surface of transmission media which is an optical path for single photons (such as an optical waveguide) via making use of differential energy spectrum or integrated spectrum, in order to monitor an abnormal event which is cause by an external light source in the environment of quantum communication, wherein the external optical frequency is equal to or higher than EUV, wherein Device-01 is usually a detector for Auger electrons, for example, an AES (Auger Electron Spectrometer) in practice; 2) a device Device-02 for detecting spin-Hall effect caused by extrinsic spin-orbit coupling via making use of voltage measurement on free electrons outside the surface of transmission media wherein the transmission media is an optical path for single photons (such as an optical waveguide), so as to confirm that in the quantum communication environment exists a meaningful external impact on local potential energy and the impact may be caused by a visible light source, wherein Device-02 is usually an extrinsic spin-Hall effect detector, for example in practice, an SHED (spin-Hall effect detector) made of p-GaAs spin injection devices; and 3) a device Device-03 which probes and scans closely to the surface of transmission media wherein the transmission media is an optical path for single photons (such as an optical waveguide) for detecting free electrons caused by a quantum tunneling effect so as to confirm that in the quantum communication environment exists a meaningful change on local system kinetic energy and the impact may be caused by an external light source, wherein the optical frequency is equal to or lower than infrared light, wherein Device-03 is usually a detector working with tiny probes, for example in practice, an STM (Scanning Tunneling Microscope). After detecting the above-mentioned specific free electrons, the three kinds of devices will derive probability distribution data of the detected free electrons for the environment-pre-checking module so that the environment-pre-checking module can help to determine whether there is an abnormal event. In other words, these devices (Device-01~Device-03) make the surveillance system focus on monitoring the electrons escaped from the surface of optical transmission media in the quantum communication environment in a specific duration, so as to determine whether there is interference from an external light source and classifies the external light source by range of optical frequency.

Referring to the same embodiment, combining the above three devices Device-01~Device-03 in an implementation of software, hardware, or a combination of software and hardware into a first sub-system S1001 as the quantum-communication-monitor sub-system for collaborating with an environment-pre-checking module M101 of the first sub-system, it not only can effectively make the system focus on monitoring specific free electrons for event categorization, but also facilitates meaningful analysis on the observations which could actually relate to risky quantum-computing threats. This is an effect that cannot be achieved by conventional technology.

Figure 4A:
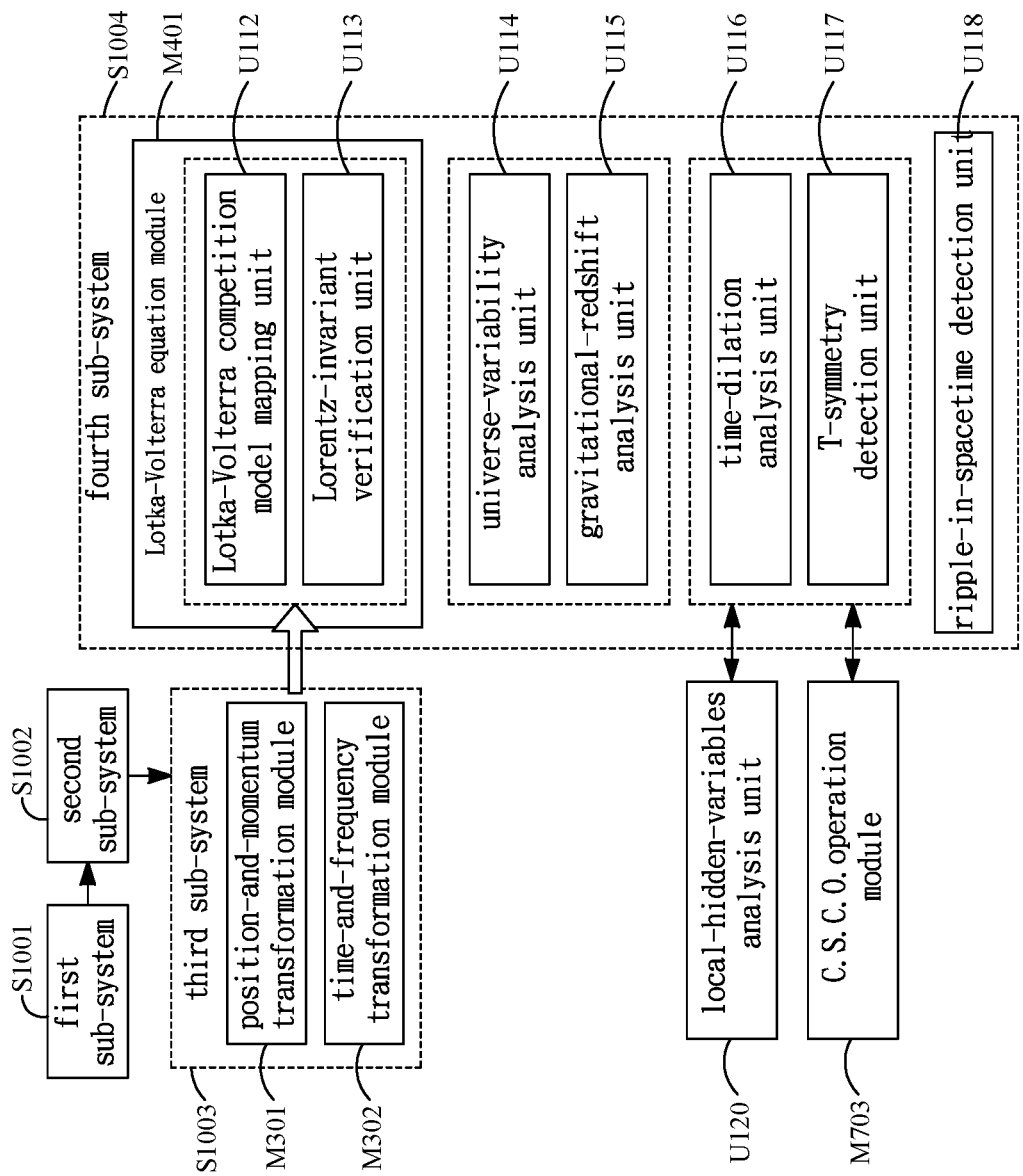
FIG. 4A is a structural block diagram of the third and fourth sub-systems according to an embodiment of the present invention.

Referring to FIG. 4A, in an embodiment, in order to confirm whether a suspicious event should be treated as a quantum-computing threat, by means of analysis with Fourier transforms, the system further comprises a third sub-system S1003 as a Fourier-transforms-analysis sub-system for performing specific Fourier transform processes to analyze whether the variation of potential energy and the relation of time-and-frequency is reasonable; and by means of dynamic-model evaluation and means of Lorentz-invariant verification, the system further comprises a fourth sub-system S1004 as a dynamic-model-evaluation sub-system which applies a Lotka-Volterra equation module M401 with Lotka-Volterra competition models to determine a suspicious event via evaluation of Lorentz invariant in a specific duration, and then performs analysis on time and space to determine whether the suspicious event should be escalated to an advanced threat level so as to trigger a risk alert.

In the embodiment shown in FIG. 4A, after the first sub-system S1001 determined there is an abnormal event, and the second sub-system S1002 confirmed the abnormal event is regarding unstable quantum communication, the surveillance system requires a third sub-system to determine whether the abnormal event should be treated as a suspicious event, and the third sub-system S1003 for this surveillance system at least comprises: a position-and-momentum transformation module M301 making use of position-and-momentum Fourier transform to analyze scientific rationality of the observation derived from captured free electrons; and a time-and-frequency transformation module M302 making use of a time-and-frequency Fourier transform to analyze scientific rationality of the observation derived from decoherenced quantum states. If there is any unreasonable observation determined by the third sub-system S1003, it will trigger the fourth sub-system S1004 which applies analysis based on Lotka-Volterra competition models and comprises: a Lotka-Volterra competition model mapping unit U112 which conducts competitive Lotka-Volterra equations (such as:

$$\frac{dx_1}{dt} = r_1 x_1 \left(1 - \left(\frac{x_1 + \alpha_{12} x_2}{K_1}\right)\right) \quad \frac{dx_2}{dt} = r_2 x_2 \left(1 - \left(\frac{x_2 + \alpha_{21} x_1}{K_2}\right)\right)$$

)

on the observations to perform a mapping process between an initial state and a final state from a dynamical-system point of view; and a Lorentz-invariant verification unit U113 which verifies that there is no Lorentz invariant existing on the mapping process. Once the Lorentz-invariant verification unit U113 determines that there is no Lorentz invariant existing in the space-time of a Lorentz transform within a specific observed duration according to the analysis on the variation of time-space between observed initial state and observed final state, that means the elements of the observations cannot be expressed by a trivial representation since there is an element that failed to be mapped to a zero vector (one-dimensional linear mapping). It implies that some element(s) of the observation has been degenerated due to some impact of external effect which may relate to quantum-computing threats that caused the unreasonable variation.

Referring to the same embodiment, combining these elements in an implementation of software, hardware, or a combination of software and hardware into a third sub-system S1003 and a fourth sub-system S1004, as a Fourier-transforms-analysis sub-system and a dynamic-model-evaluation sub-system, it not only can effectively determine the scientific rationality of the observed variation for a suspicious event, but also facilitates determination of whether the suspicious event should be further analyzed for determining it is a quantum-computing threat since some element(s) of the observations has been degenerated due to an external impact. This is an effect that cannot be achieved by conventional technology.

Figure 5A:
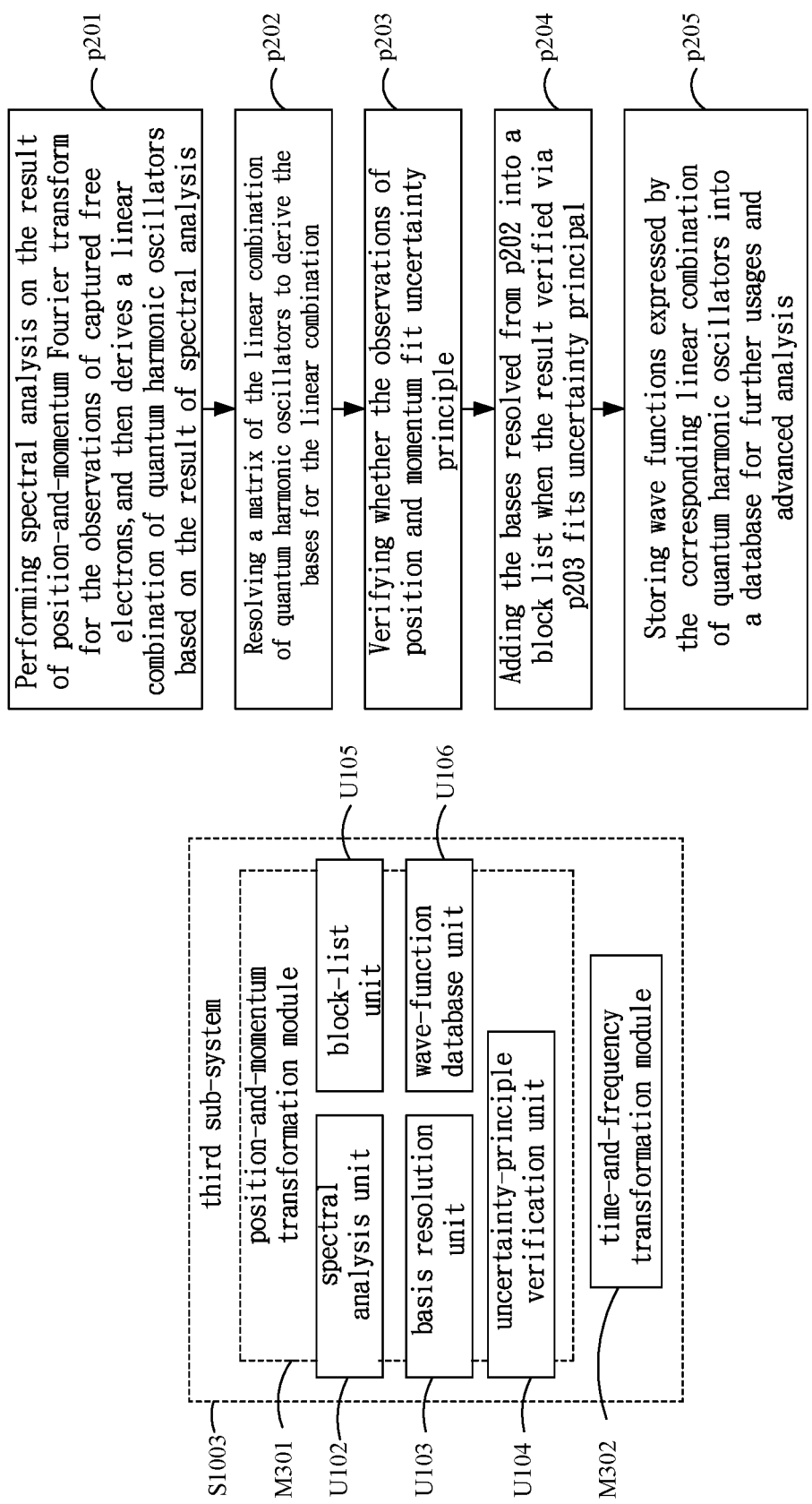
FIG. 5A is a block diagram of the third sub-system according to an embodiment of the present invention.

Further, also referring to FIG. 5A, in an embodiment, in order to verify the scientific rationality based on the observations of captured free electrons via a set of practical processes and then make suitable decisions for the result of verification, the third sub-system S1003 not only drives the position-and-momentum transformation module M301 to perform a position-and-momentum Fourier transform on the observations of captured free electrons, but further comprises the following units for performing required processes (shown as blocks p201~p205 in FIG. 5A): a spectral analysis unit U102, a basis resolution unit U103, an uncertainty-principle verification unit U104, a block-list unit U105, and a wave-function database unit U106. Wherein, the spectral analysis unit U102 performs spectral analysis process p201 on the result of the position-and-momentum Fourier transform for the observations of captured free electrons to confirm whether there is a possible quantum harmonic oscillator within the observations so as to derive a linear combination of quantum harmonic oscillators; the basis resolution unit U103 performs a basis resolution process p202 for resolving the derived linear combination of quantum harmonic oscillators to derive corresponding bases; and the uncertainty-principle verification unit U104 performs an uncertainty-principle verification process p203 to verify whether the result of the position-and-momentum Fourier transform for the observations of captured free electrons fits the uncertainty principle. Once the uncertainty-principle verification unit U104 determines that the result of the position-and-momentum Fourier transform fits the uncertainty principle and the bases can be derived by the basis resolution unit U103 successfully, the block-list unit U105 will add the bases into a block list so that the system can help to perform a process p204 for blocking such quantum communication when a combination of the related suspicious bases is condemned as a threat in the future. Moreover, the wave-function database unit U106 can perform a process p205 for storing wave functions expressed by the corresponding linear combination of quantum harmonic oscillators into a database so that the system will be able to perform further analysis and tracing policies in the future.

Figure 5B:
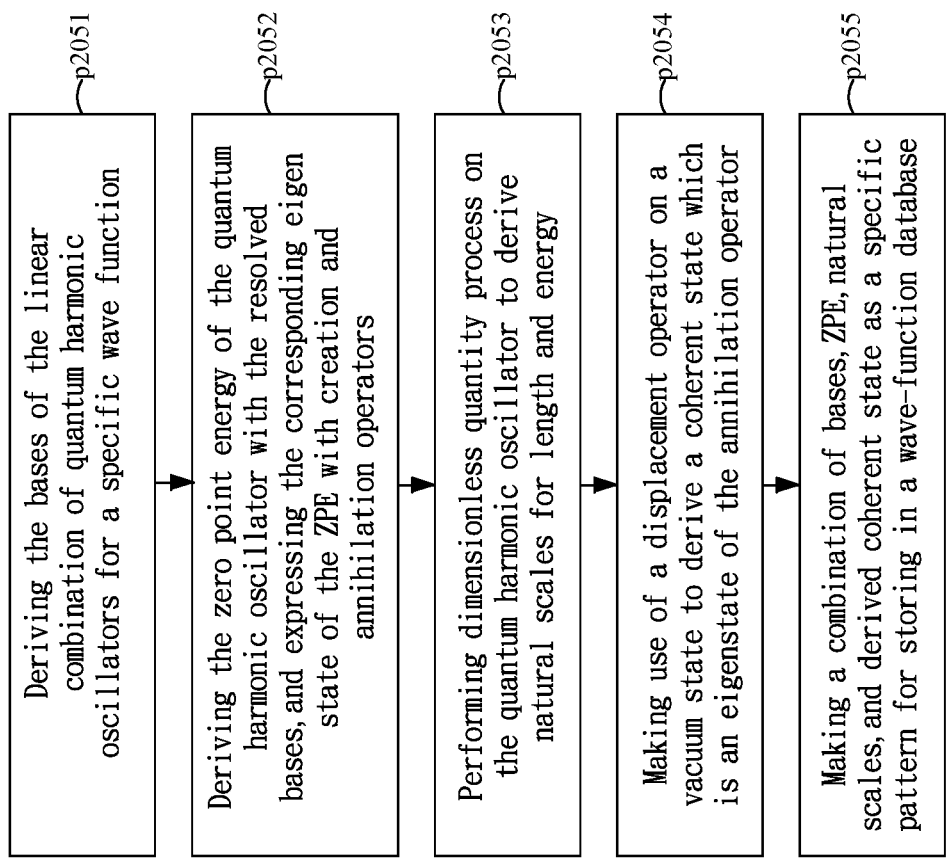
FIG. 5B is a block diagram of the wave-function database unit related to FIG. 5A.

Also referring to FIG. 5B for the same embodiment, in order to achieve the goal of the above-mentioned process p205 performed by the wave-function database unit U106, p205 usually includes the following subroutines (as shown in blocks p2051~p2055) in steps: 1) a subroutine p2051 for deriving the bases of the linear combination of quantum harmonic oscillators, wherein the bases can stand for a specific wave function; 2) a subroutine p2052 for deriving the ZPE (zero point energy) of the quantum harmonic oscillator with the resolved bases, and expressing the corresponding eigen state of the ZPE with creation operator and annihilation operator; 3) a subroutine p2053 for performing a dimensionless quantity operation on the quantum harmonic oscillator to derive natural scales for length and energy; 4) a subroutine p2054 for making use of a displacement operator on a vacuum state to derive a coherent state which is an eigenstate of the annihilation operator (for example:

$$\hat{D}(\alpha)|0\rangle = |\alpha\rangle$$

where |α⟩ is a coherent state); and 5) a subroutine p2055 for making a combination of bases, ZPE, natural scales, and the derived coherent state as a specific pattern for storing in a wave-function database.

Referring to the same embodiment, combining these elements in software, hardware, or a combination of software and hardware into a Fourier-transforms-analysis sub-system S1003 for collaborating with a position-and-momentum transformation module M301, it not only effectively facilitates to analyze the abnormal variation of potential energy based on the observation of captured free electrons so as to determine whether the analyzed event is a suspicious event, but also facilitates future security policies and condemnations via making use of the patterns stored in a proprietary database. This is an effect that cannot be achieved by conventional technology.

Figure 6A:
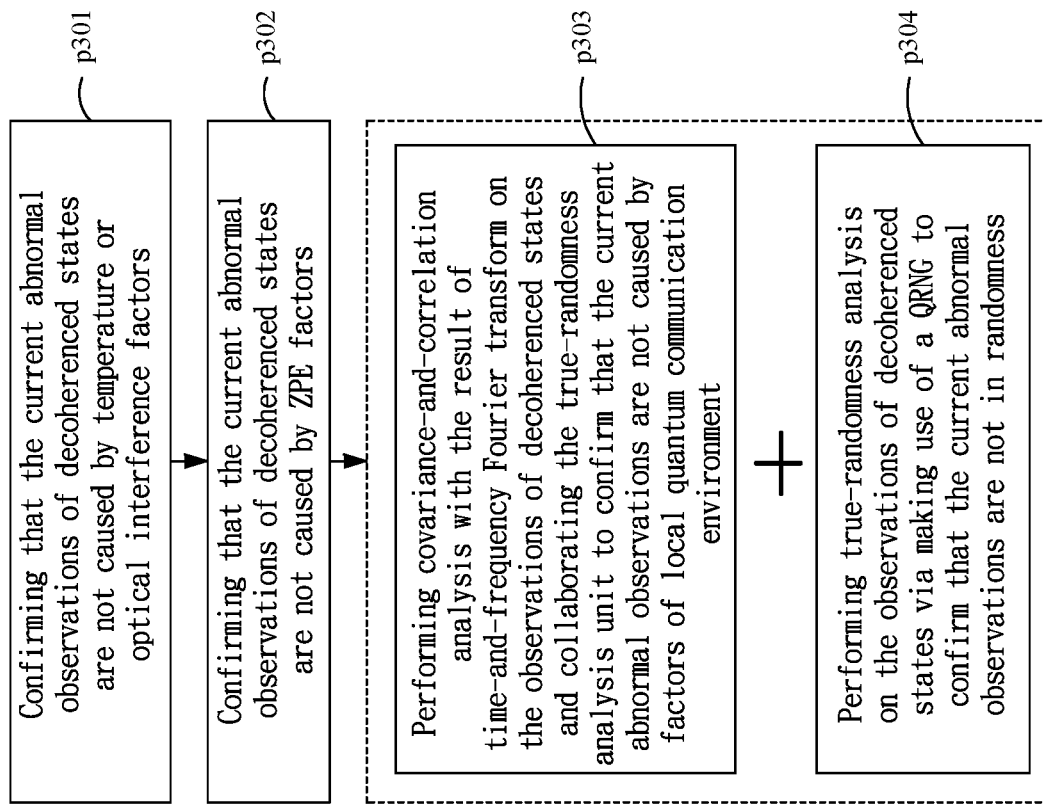
FIG. 6A is a block diagram of the third sub-system according to an embodiment of the present invention.
Figure 6A:
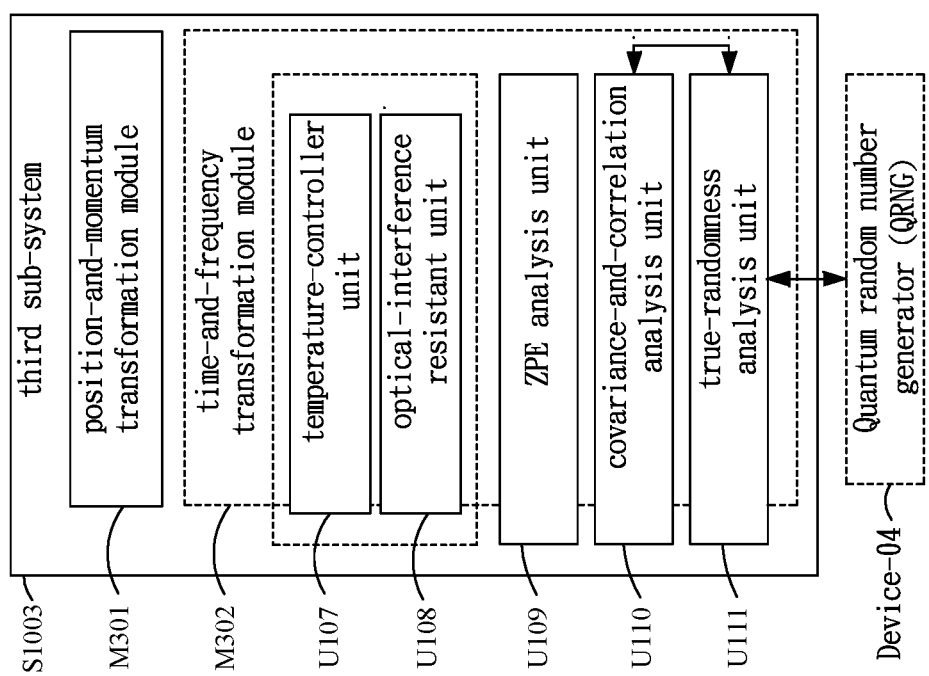

Further referring to FIG. 6A, in an embodiment, in order to verify the scientific rationality based on the observations derived from decoherenced quantum states via a set of practical processes and then make suitable decisions for the result of verification, the third sub-system S1003 not only drives the time-and-frequency transformation module M302 to perform time-and-frequency Fourier transform on the observations derived from decoherenced quantum states, but further comprises the following units for performing required processes (shown as blocks p301~p304 in FIG. 6A): a temperature-controller unit U107, an optical-interference resistant unit U108, a ZPE analysis unit U109, a covariance-and-correlation analysis unit U110, and a true-randomness analysis unit U111. Wherein, as shown in block p301, the temperature-controller unit U107 and the optical-interference resistant unit U108 collaborate with a decoherence measurement process p301 so as to confirm that the current abnormal observations of decoherenced states are not caused by temperature or optical interference factors. A suggested implementation of U107 and U108 for p301 is to work with a temperature sensor (as a U107) and a LIDAR (light detection and ranging) device (as a U108); so that according to the information derived from U107 and U108, p301 can verify whether there is any significant variation on temperature or light related factors in the local communication environment before, during, and after a specific observed duration. Thereafter, as shown in block p302, according to the result of the time-and-frequency Fourier transform on the observations of decoherenced states, the ZPE analysis unit U109 performs a ZPE (zero-point energy)

analysis process which confirms that the expected value of the current abnormal observations on decoherenced states are not closed to the expected value of ZPE. Once the ZPE analysis unit U109 determines the above two expected values are significantly closed to each other based on a reasonable confidence level, that implies the current abnormal decoherenced observations are caused by ZPE factors, the third sub-system S1003 will by-pass the analyzed event directly. Otherwise, as shown in both blocks p303 and p304, the covariance-and-correlation analysis unit U110 collaborates with a true-randomness analysis unit U111 to perform a covariance-and-correlation analysis process p303 which includes a set of subroutines with coded algorithms for analysis on the result of the time-and-frequency Fourier transform on the observations of decoherenced states, so as to confirm that the current abnormal observations are not caused by factors of the local quantum communication environment. Wherein, the true-randomness analysis unit U111 usually collaborates with a QRNG (quantum random number generator) Device-04 for calibration first, and then support U110 to perform a true-randomness analysis process p304 on the observations of decoherenced states for confirming whether the current abnormal observations are in randomness.

Figure 6B:
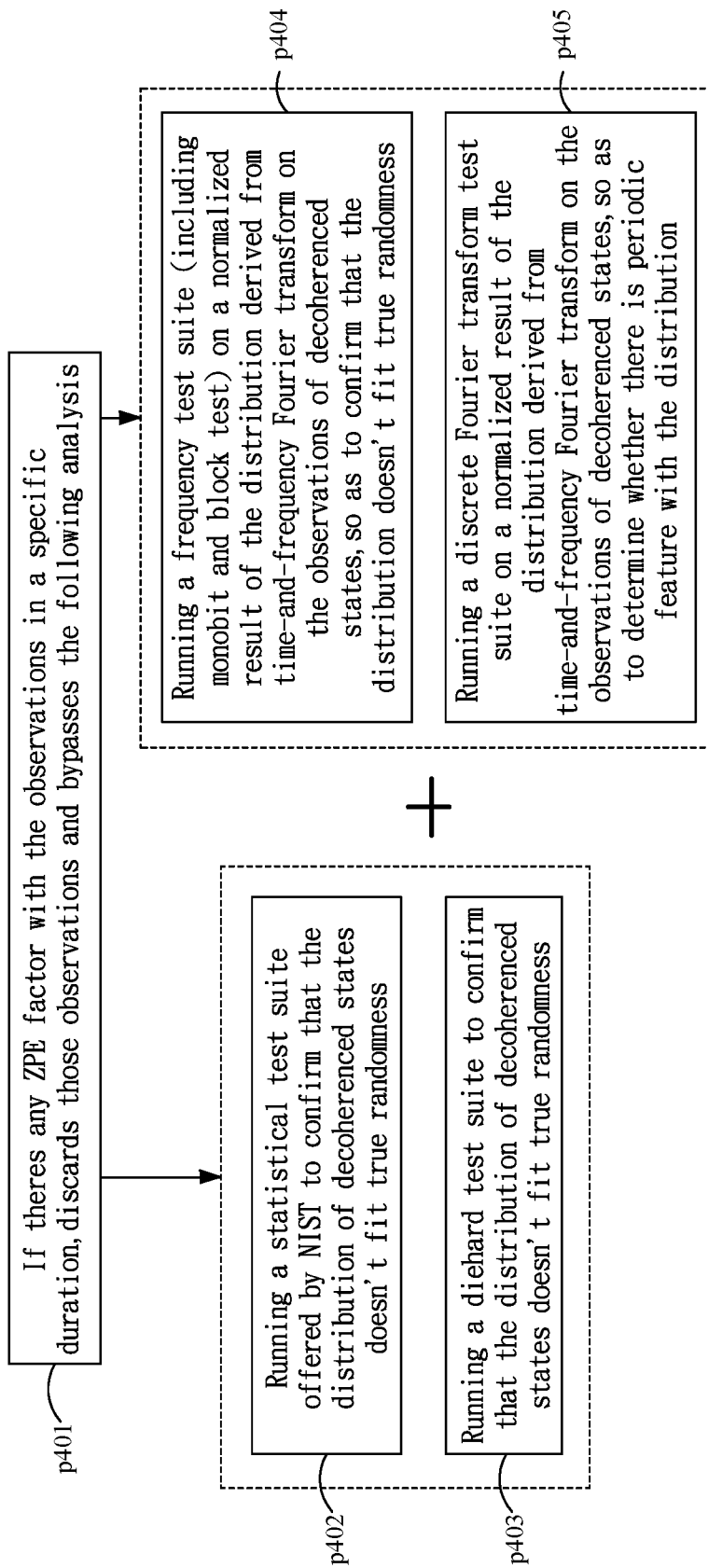
FIG. 6B is a block diagram of the covariance-and-correlation analysis unit related to FIG. 6A.

Also referring to FIG. 6B which is an illustration of an embodiment for implementing main subroutines of p304 for a covariance-and-correlation analysis unit U110 collaborating with a true-randomness analysis unit U111 to confirm that the distribution of decoherenced states doesn't fit true randomness, the workflow driven by the covariance-and-correlation analysis unit U110 usually includes the following subroutines (as shown in blocks p401~p405): 1) a subroutine p401 for discarding the observations and bypassing the following processes when there is a result confirmed by the above-mentioned ZPE analysis unit U109 that there is a ZPE factor with the observations in a specific duration; 2) a subroutine p402 for running a statistical test suite offered by NIST (for example: SP800-22 Test Suite published by National Institute of Standards and Technology) to confirm that the distribution of decoherenced states doesn't fit true randomness; 3) a subroutine p403 for running a diehard test suite (for example: METAS Certification Test) to confirm that the distribution of decoherenced states doesn't fit true randomness; 4) a subroutine p404 for running a frequency test suite (including monobit and block test) on a normalized result of the distribution derived from the time-and-frequency Fourier transform on the observations of decoherenced states, so as to confirm that the distribution doesn't fit true randomness; and 5) a subroutine p405 for running a discrete Fourier transform test suite on a normalized result of the distribution derived from the time-and-frequency Fourier transform on the observations of decoherenced states, so as to determine whether there is periodic feature with the distribution. Wherein, p402~p405 are not necessary to be performed in sequence; and once any of them can determine the observed decoherence doesn't fit true randomness, U110 will be able to by-pass other subroutines and complete p304 directly for saving system resources.

Figure 6C:
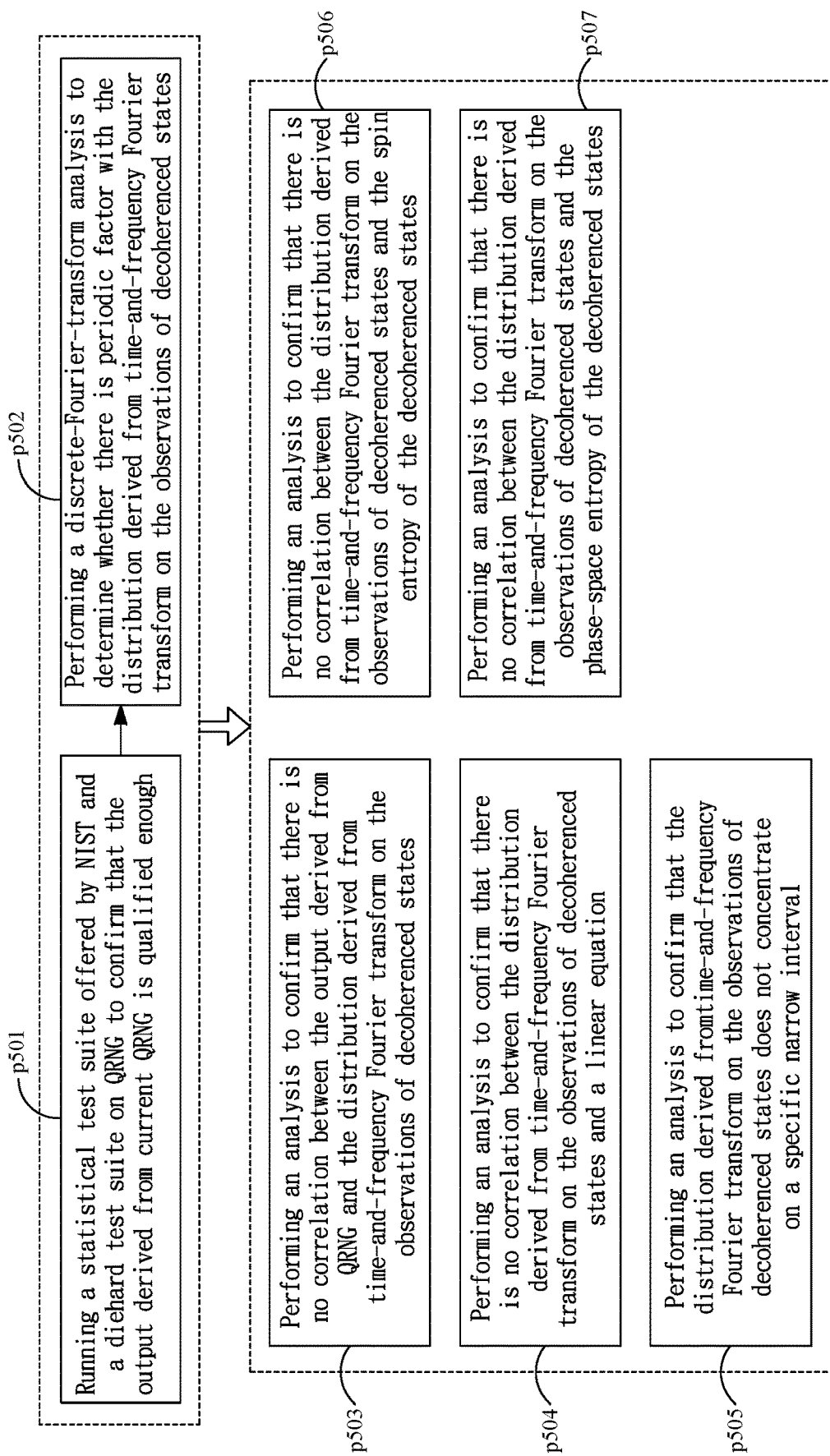
FIG. 6C is a detailed block diagram of block p303 which is described in FIG. 6A.

However, the above-mentioned processes p401~p405 are mainly for determining that the distribution of decoherenced states doesn't fit true randomness in an observed duration first. Furthermore, in order to achieve the goal of the above-mentioned p303 to confirm that the current abnormal observations are not caused by factors of local quantum communication environment, also referring to FIG. 6C for an embodiment in more details, the process p303 shall include the following subroutines with coded algorithms (shown as blocks p501~p507): 1) a subroutine p501 for running a statistical test suite offered by NIST and a diehard test suite on QRNG to confirm that the output derived from the current QRNG is qualified enough first; and then 2) a subroutine p502 for performing a discrete-Fourier-transform analysis to determine whether there is periodic factor with the distribution derived from a time-and-frequency Fourier transform on the observations of decoherenced states. After the subroutine p502 determining that there is a periodic factor with the observed distribution, the following subroutines will be triggered: 1) a subroutine p503 for performing an analysis on covariance and coefficients of correlation to confirm that there is no correlation between the output derived from QRNG and the distribution derived from the time-and-frequency Fourier transform on the observations of decoherenced states; 2) a subroutine p504 for performing an analysis on covariance and coefficients of correlation to confirm that there is no correlation between the distribution derived from the time-and-frequency Fourier transform on the observations of decoherenced states and a linear equation, and it implies trying to filter out the event caused by linear issues (for example: temperature related factors); 3) a subroutine p505 for performing an analysis on covariance and coefficients of correlation to confirm that the distribution derived from the time-and-frequency Fourier transform on the observations of decoherenced states does not concentrate on a specific narrow interval, and it usually implies trying to filter out an occasional incident related to the local communication environment; 4) a subroutine p506 for performing an analysis on covariance and coefficients of correlation to confirm that there is no correlation between the distribution derived from the time-and-frequency Fourier transform on the observations of decoherenced states and the spin entropy of the decoherenced states, and it usually implies trying to filter out an event caused by the temperature variation of the local communication environment; and 5) a subroutine p507 for performing an analysis on covariance and coefficients of correlation to confirm that there is no correlation between the distribution derived from the time-and-frequency Fourier transform on the observations of decoherenced states and the entropy of the decoherenced states from phase space, and it usually implies trying to filter out an event caused by the quality of optical transmission in the local communication environment. Thereby, once the covariance-and-correlation analysis unit U110 determines that the current abnormal observations of decoherenced states are not in randomness nor caused by factors of the local quantum communication environment, the third sub-system S1003 will be able to treat the abnormal event as a suspicious event.

Thus, the third sub-system S1003 as a Fourier-transforms-analysis sub-system can efficiently drive the position-and-momentum transformation module M301 and the time-and-frequency transformation module M302 to determine a suspicious event which triggers further risky analysis performed by the fourth sub-system S1004 which is a dynamic-model-evaluation sub-system. Referring to the same embodiments, combining these elements in software, hardware, or a combination of software and hardware into a Fourier-transforms-analysis sub-system S1003, it not only can effectively facilitate analyzing of the abnormal observations of free electrons at first sight and the further check observed decoherenced states so as to determine whether the analyzed event is a suspicious event, but also helps to classify the abnormal observations of decoherenced states. Since an abnormal observation of decoherenced states may be caused by a regular factor such as a local quantum communication environment issue, it is important to identify and classify the observed decoherenced states so as to depress false alerts for a quantum communication surveillance system. This is an effect that cannot be achieved by conventional technology.

In an embodiment, referring to FIG. 4A, in order to classify a possible quantum-computing threat, the fourth sub-system S1004 for analysis based on dynamic models (such as Lotka-Volterra competition model) not only applies a Lotka-Volterra equation module M401 but further comprises: a universe-variability analysis unit U114, a gravitational-redshift analysis unit U115, and a ripple-in-spacetime detection unit U118. Wherein, after the Lorentz-invariant verification unit U113 of the fourth sub-system S1004 determines that there is no Lorentz invariant existing in the space-time of the Lorentz transform within a specific duration across the mapping process performed by the Lotka-Volterra competition model mapping unit U112, the universe-variability analysis unit U114 performs a universe-variability analysis process so as to confirm whether the current quantum communication environment is impacted by factors of space curve, space collapse, or space singularity. Wherein, U114 mainly performs verifications to check the following factors in the universe-variability analysis process: 1) whether the observed optical frequency is changed with variation of polarized states; 2) whether the observed optical frequency is changed with absorption of electrons; 3) whether the observed optical frequency is changed with scattering of alpha particles; 4) whether there is a significant occurrence of degenerated states on the observed free electrons; 5) whether there is EIT (Electromagnetically Induced Transparency) on the observed free electrons; and 6) whether there is a significant change of electric dipole on the observed free electrons. Meanwhile, the gravitational-redshift analysis unit U115 performs gravitational-redshift analysis process for checking whether there is a meaningful variation on optical frequency and optical wavelength in the local quantum communication environment, wherein the decreasing ratio of optical frequency is equivalent to the increasing ratio of optical wavelength and vice versa, so as to confirm whether the local quantum communication environment is impacted by factors of gravity anomaly due to close-to or far-away of a gravity field. Besides, the ripple-in-spacetime detection unit U118 performs a gravity-wave analysis process including a set of subroutines so as to confirm whether the current quantum communication environment is impacted by factors of ripple in spacetime.

Still referring to FIG. 4A, in another embodiment, in order to verify a possible quantum-computing threat, the fourth sub-system S1004 for analysis based on dynamic models (such as Lotka-Volterra competition model) not only applies a Lotka-Volterra equation module M401 but further collaborates with a local-hidden-variables analysis unit U120 to determine whether there is time related factor impacting on observed decoherenced states so as to collaborate with a C.S.C.O. (complete set of commuting observables) operation module M703 for quantum information recovery, wherein the fourth sub-system S1004 further comprises: a time-dilation analysis unit U116, a T-symmetry detection unit U117, and a ripple-in-spacetime detection unit U118. Wherein, after the Lorentz-invariant verification unit U113 of the fourth sub-system S1004 determines that there is no Lorentz invariant existing in the space-time of the Lorentz transform within a specific duration across the mapping process performed by the Lotka-Volterra competition model mapping unit U112, the time-dilation analysis unit U116 performs time-dilation analysis process which verifies whether the Lorentz factor $$\gamma = \frac{1}{\sqrt{1-\frac{v^2}{c^2}}} = \frac{1}{\sqrt{1-\beta^2}} = \frac{dt}{d\tau}$$

is larger than 1, so as to confirm whether the current quantum communication environment is impacted by factors of time dilation. Meanwhile, the T-symmetry detection unit U117 performs time-symmetry analysis process which confirms whether there is time reversal invariance in the local quantum communication environment under the condition of discarding the effect of system friction.

Figure 4B:
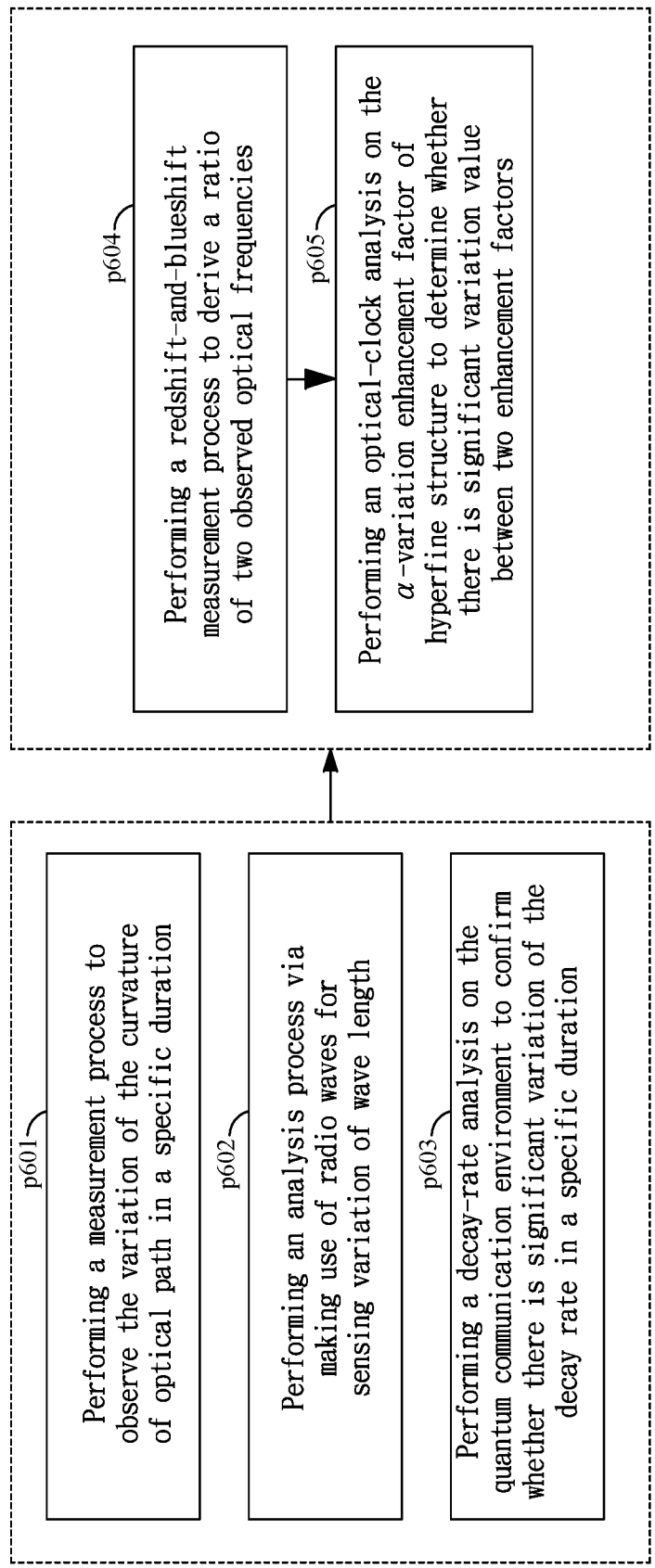
FIG. 4B is a block diagram of the ripple-in-spacetime detection unit related to FIG. 4A.

Besides, the ripple-in-spacetime detection unit U118 conducts Lorentz transformation in consideration of the principle of relativity which prevents the distortion of the observed information first, and then performs gravity-wave analysis process which applies optical atomic clock related technology and includes a set of subroutines with coded algorithms so as to confirm whether the current quantum communication environment is impacted by factors of gravity waves. Also referring to FIG. 4B as shown in blocks p601~p605, the above-mentioned subroutines performed by the ripple-in-spacetime detection unit U118 at least comprises: 1) a subroutine p601 for performing a measurement process to observe the variation of the curvature of the optical path in a specific duration to confirm whether there is gravity-wave related factor; 2) a subroutine p602 for performing an analysis process via making use of observing regular-pulse radio waves in a specific duration for sensing variation of wave length to confirm whether there is gravity-wave related factor; 3) a subroutine p603 for performing a decay-rate analysis on the quantum communication environment to check whether there is significant variation of the decay rate in a specific duration so as to confirm whether there is a gravity-wave related factor; 4) a subroutine p604 for performing a redshift-and-blueshift measurement process to derive a ratio of two observed optical frequencies and a ratio of two observed optical wave-lengths in a specific duration for the local quantum communication environment to verify whether the two absolute values of the above two ratios can be treated as equivalent so as to confirm whether there is a gravity-wave related factor; and 5) a subroutine p605 for performing an optical-clock analysis on the α-variation enhancement factor of hyperfine structure (for example:

$$K = \frac{2q}{E_0},$$

K is the α-variation enhancement factor, and q implies the variation of transition energy based on $E_0$ which is a configured central energy for an optical atomic clock) to determine whether there is a significant variation value between two enhancement factors observed in a specific duration so as to confirm whether there is a gravity-wave related factor. For an efficient way in practice, in an embodiment, the ripple-in-spacetime detection unit U118 can check whether one of p601~p603 is satisfied first, and then verify whether one of p604~p605 can be satisfied so as to determine the analyzed event is significantly impacted by gravity-wave related factors.

Referring to the same embodiments, combining the above elements in software, hardware, or a combination of software and hardware into a fourth sub-system S1004 as a dynamic-model-evaluation sub-system, it not only helps to confirm some element of a suspicious observation has been degenerated due to an external effect, but also help to confirm the risky change is not due to factors of universe variability, gravity variation, or gravity waves, and meanwhile there is time reversal invariance within the observations. That facilitates to determine a risky event actually related to quantum-communication threats. Thereby, besides suppressing most of the possible false alerts by checking factors of time, space, and gravity waves, the technology of this fourth sub-system is able to determine whether there is a significant variation of the local quantum communication environment, and it is possible to raise an alert for a wrong teleportation configuration as well. This is an effect that cannot be achieved by conventional technology.

Figure 7:
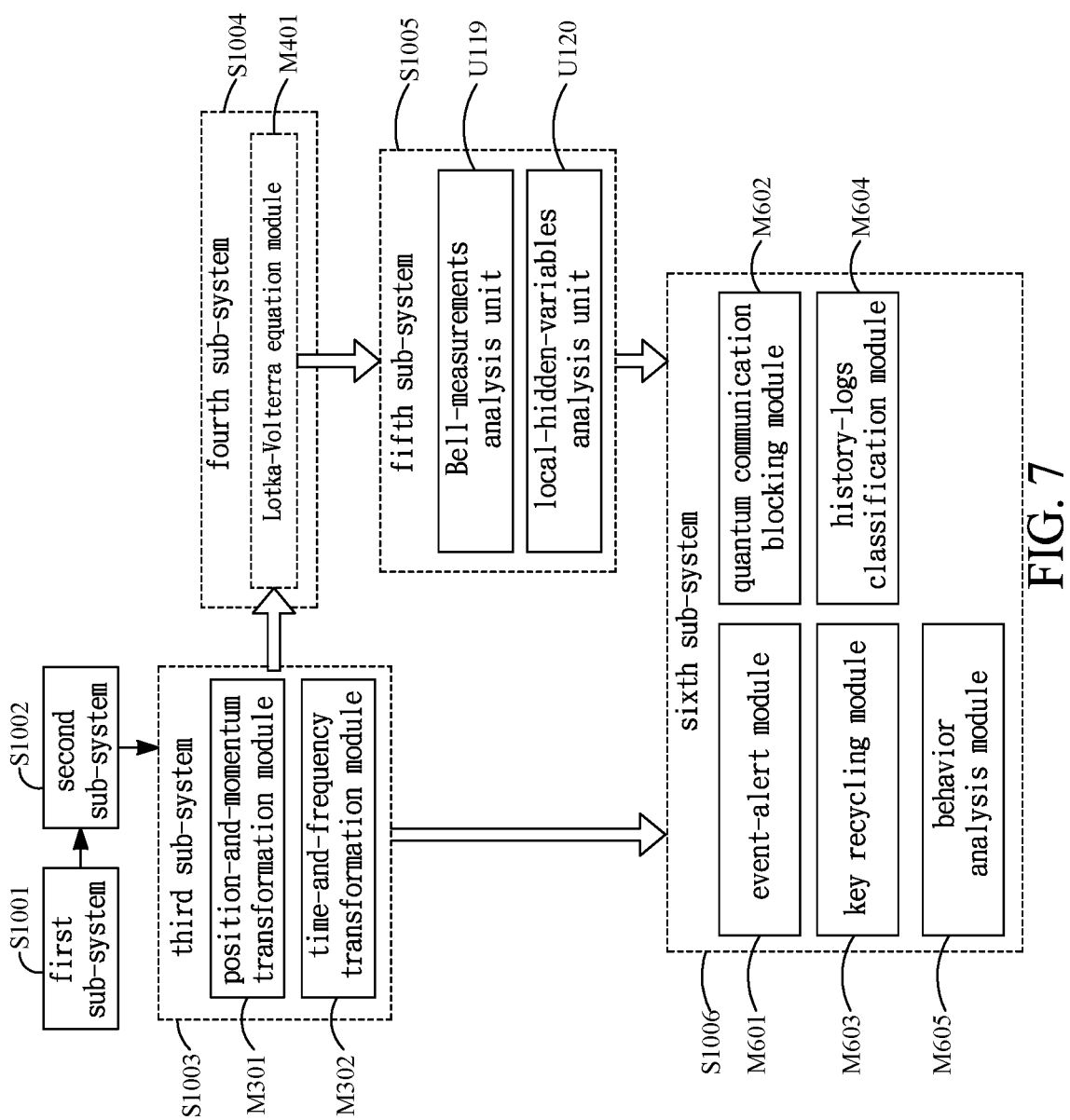
FIG. 7 is a structural block diagram of the fifth and sixth sub-systems according to an embodiment of the present invention.

In addition, in some embodiments, referring to FIG. 7, in order to trace possible quantum-computing threats in quantum communication environments, via technology of Bell measurement and means of local-hidden-variables analysis, the system further comprises a fifth sub-system S1005 for performing quantum-teleportation analysis processes to label or characterize various teleportation channels, and a sixth sub-system S1006 for logging and analyzing history threats. To achieve the above effects, the fifth sub-system S1005 at least comprises: a Bell-measurements analysis unit U119 for performing Bell-measurements analysis processes which confirm that the observation violates local realism first in order to assure that the current observation is entanglement, and then find the cases that the received quantum state is not in maximum entanglement via the way of entanglement measures; and a local-hidden-variables analysis unit U120 for performing local-hidden-variables analysis process which makes use of Gisin's theorem (published by Nicolas Gisin, Switzerland) within the impacted local quantum communication environment to derive all of the possible entangled states according to current observations, and then performs POVM (positive operator-valued measure) operation on the states derived by use of Gisin's theorem, that implies patterning something related to the local hidden variables in the form of POVM. To explain more, considering that the observations are already confirmed to violate local realism, since all of the possible entangled states derived with Gisin's theorem implies disclosing all possible observed types of predictions regarding the future behavior of the system which lacks off maximum entanglement, it is reasonable to the surveillance system to treat the possible entangled states in the form of POVM as a pattern related to the influence of local hidden variables. Thereby, the present invention can label an observed teleportation channel in this way. In this embodiment, according to the result of analysis performed by the third sub-system S1003 and the fourth sub-system S1004, the system can define such an event that implies there is some unusual hidden variable within the local quantum communication environment which is worth logging the analyzed states as a pattern in the form of POVM for identifying a specific quantum teleportation channel related to some quantum-computing threat.

In the same embodiments, still referring to FIG. 7, once the fifth sub-system S1005 determines that the current event should be logged, it will trigger the sixth system S1006 for tracing history logs, and the sixth sub-system S1006 at least comprises: an event-alert module M601, a quantum communication blocking module M602, a key recycling module M603, a history-logs classification module M604, and a behavior analysis module M605. Wherein, the event-alert module M601 provides alerts for possible quantum-computing threats or quantum communication quality events. An implementation of the event-alert module M601 is preparing a virtual machine to receive notifications sent from different sub-systems (S1001~S1004) for different levels of alert. For example, defining the levels of alert as abnormal-1, abnormal-2, suspicious-1, suspicious-2, and threat-1, S1001 and S1002 provide notification of abnormal events with alerts of abnormal-1 and abnormal-2 to M601; S1003 provides notification of suspicious events with alerts of suspicious-1 and suspicious-2 to M601; and S1004 provides notification of risky events with alerts of threat-1 to M601. However, this is only a feasible instance for an event-alert module M601, and the implementation and deployment of M601 is not limited thereto.

According to the related information (such as the corresponding escalation levels, the patterns stored by a block-list unit U105 of the third sub-system S1003 (as shown in FIG. 5A), the patterns stored by a wave-function database unit U106 of the third sub-system S1003 (as shown in FIG. 5A), the patterns derived by a local-hidden-variables analysis unit U120 of the fifth sub-system S1005 (as shown in FIG. 7), or the data stored by a history-logs classification module M604 of the sixth sub-system S1006 (as shown in FIG. 7)), the quantum communication blocking module M602 determines whether and how to block a quantum communication. However, this is only a feasible instance for a quantum communication blocking module M602, and the implementation and deployment of M602 is not limited thereto. Meanwhile, the key recycling module M603 determines whether to enable a key-recycling process according to an observed attacking cycle of a quantum-computing threat. Here the mentioned key-recycling process means a generic key recycling mechanism which is usually adopted by a KMS (key management system), and M603 mainly focus on determining a timing to trigger the key-recycling process due to security concerns. Besides, the history-logs classification module M604 stores the event data into a file system for history logs, and classifies the received event data. Moreover, the behavior analysis module M605 performs behavior analysis on the event data stored and classified by M604 as possible quantum-computing threats, wherein the behavior analysis finds the periodicity of the alerted events, analyzes common bases of quantum states from a bunch of history events, and performs analysis on entanglement measures. Thereby, M605 will be able to condemn a malicious or suspicious behavior within a quantum communication.

Referring to the same embodiments, combining these elements in software, hardware, or a combination of software and hardware into a quantum-teleportation analysis module for the fifth sub-system S1005 and a set of log-and-trace services as the sixth sub-system S1006, it not only can effectively facilitate identification of a risky quantum-teleportation channel, but also helps to log the related quantum-computing threats for required responses and further analysis so as to lock on a quantum-computing threat in a practical way. This is an effect that cannot be achieved by conventional technology.

Figure 8:
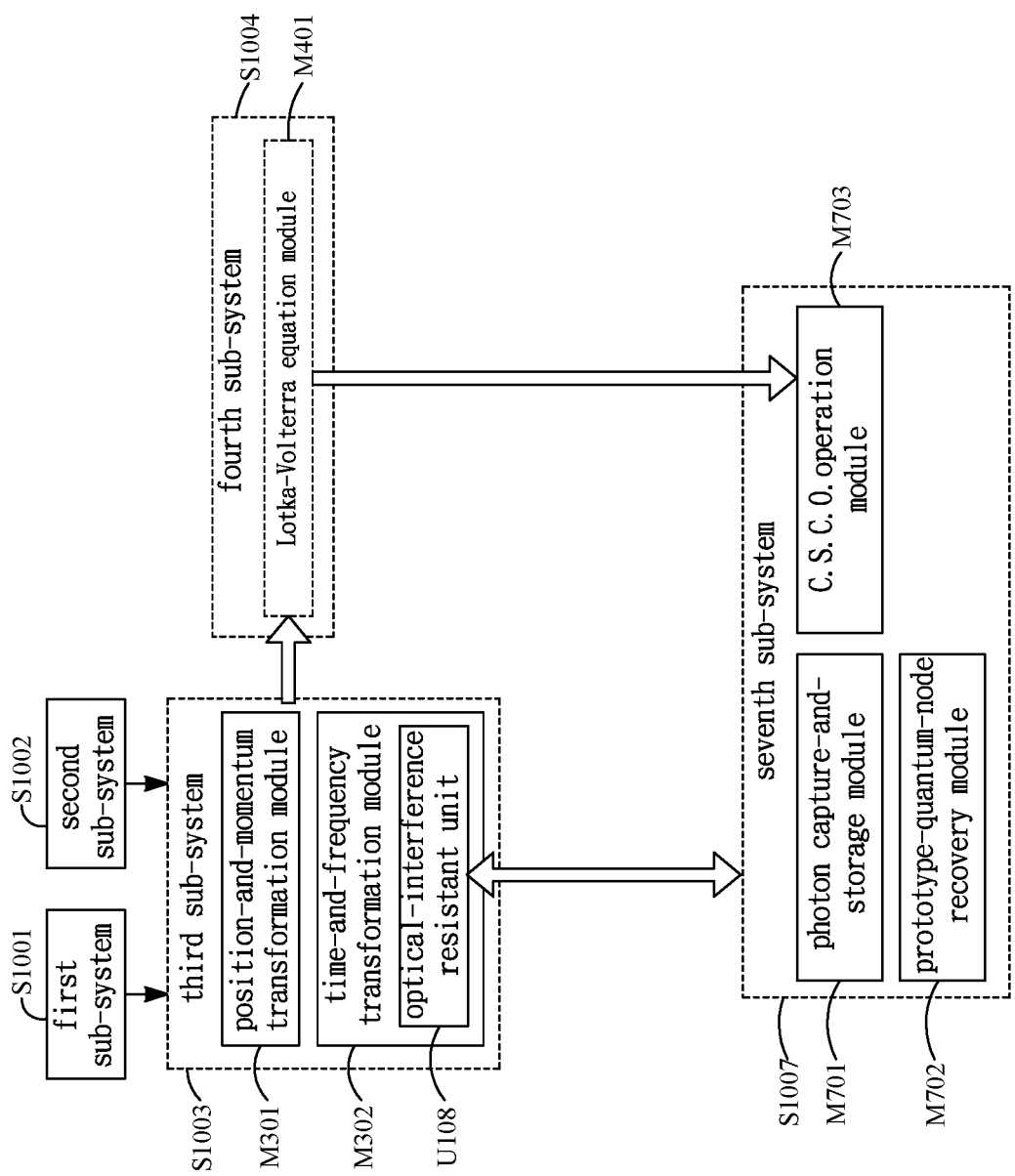
FIG. 8 is a structural block diagram of the seventh sub-system according to an embodiment of the present invention.

Referring to FIG. 8, in an embodiment, in order to perform suitable actions on impacted quantum information (or states), the system further comprises a seventh sub-system S1007 via means of signal-loss correction for performing information recovery processes to recover impacted quantum information or Qubits occasionally caused by factors of time dilation, time-asymmetry, or ripple in space-time (gravity waves). To achieve such effect, the seventh sub-system S1007 collaborates with an optical-interference resistant unit U108 of the third sub-system S1003 and at least comprises: a photon capture-and-storage module M701, a prototype-quantum-node recovery module M702, and a C.S.C.O. operation module M703. Based on the operations with U108, M701, M702, and M703, the means of signal-loss correction will be performed. Wherein, the photon capture-and-storage module M701 facilitates capturing and storing photons at least for milliseconds via controlling a prototype-quantum-node recovery module M702. Usually, M701 is coded logics performed by processors to drive M702 which can be a device made of components with silicon-vacancy color centers (such as diamond). Meanwhile, the prototype-quantum-node recovery module M702 provides ability to catch, store, and re-entangle bits of quantum information for correction of signal loss. Besides, the C.S.C.O. operation module M703 performs processes for making use of C.S.C.O. (complete set of commuting observables) to recover degenerated quantum information or qubits, wherein the processes mainly include the following subroutines: 1) a subroutine for performing non-orthogonal conversion on the observed quantum states to derive eigen states on an orthogonal coordinate system first; 2) a subroutine for validating whether a Hermitian transform is applicable for the derived eigen states; 3) a subroutine which performs phase correction on the derived eigen states to confirm there is still a degenerated state, and then verifies the dimension of observed state so as to perform a matrix operation for making use of C.S.C.O. (Complete set of commuting observables) to recover the degenerated state if the above-mentioned Hermitian transform is applicable, and then gets a recovered completed result for maintaining the completeness of the received quantum states; and at last 4) a subroutine to determine the analyzed event as a quantum-computing threat directly once the above subroutines are failed to recover the degenerated quantum state in a reasonable duration.

Referring to the same embodiments, combining these elements in software, hardware, or a combination of software and hardware into a seventh sub-system S1007 as a quality service for the current quantum communication, it not only can effectively maintain the quality of quantum transmission via optical paths, but also helps to recover the degenerated quantum states. This is an effect that cannot be achieved by conventional technology.

Figure 9:
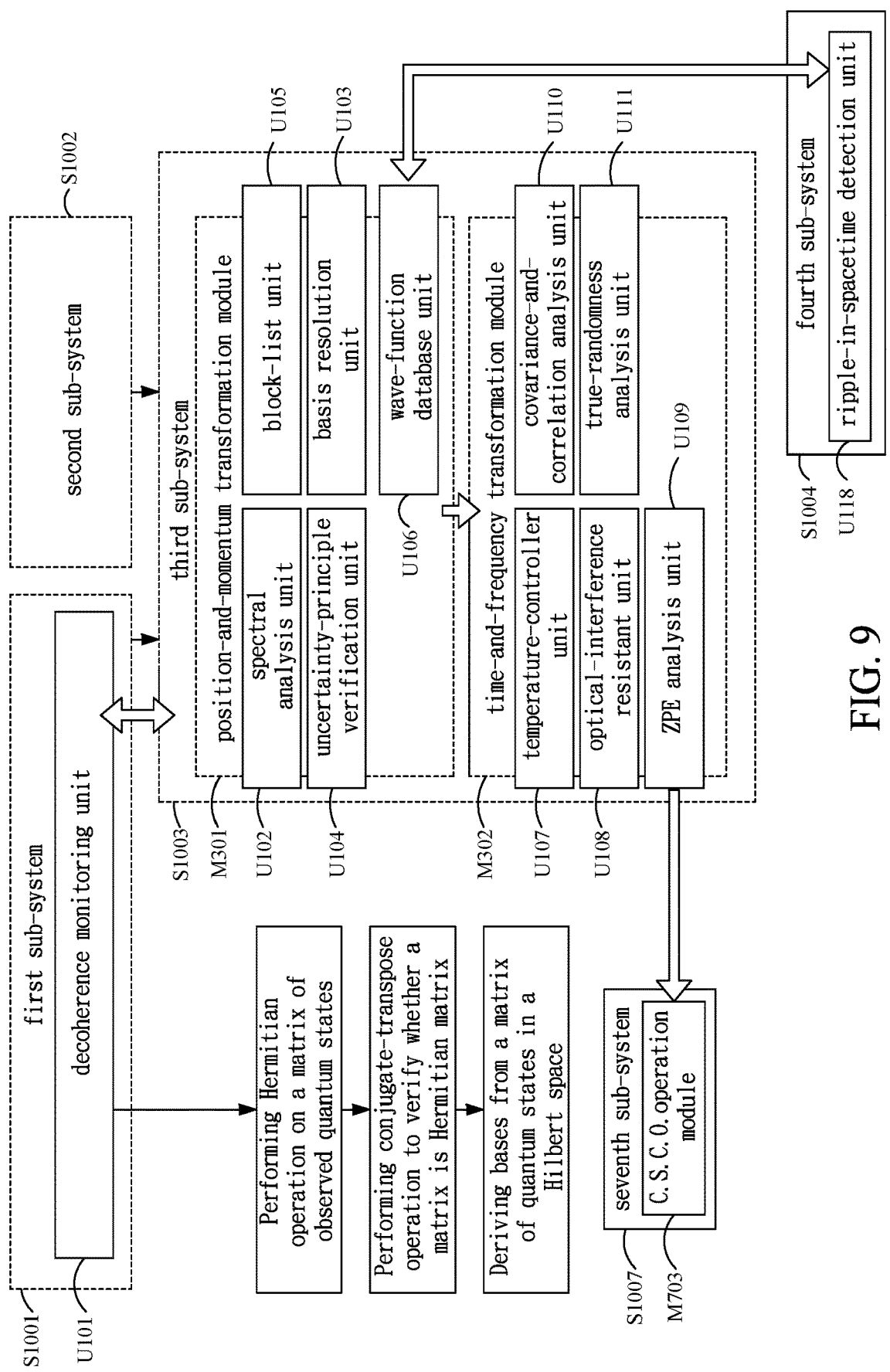
FIG. 9 is a structural block diagram of the system according to an embodiment of the present invention.

In addition, referring to FIG. 9A, in some embodiments, in order to efficiently classify a specific quantum-computing threat which relates to factors of gravity waves, once the position-and-momentum transformation module M301 of the third sub-system S1003 determines that there is a suspicious event, the third sub-system S1003 will collaborate with the decoherence monitoring unit U101 of the first sub-system S1001 to confirm that there is not only space-time variation but also abnormal decoherenced states in current quantum communication environment, and then collaborates with a ripple-in-spacetime detection unit U118 of the fourth sub-system S1004 to perform a gravity-wave analysis process on variation of optical frequency and variation of time dilation via making use of optical atomic clocks, so as to determine whether the local quantum communication environment is impacted by factors of gravity waves. In brief, since finding a gravity-wave related event is usually valuable and the regular workflow from the first sub-system S1001 to the fourth sub-system S1004 may cost more for finding a gravity-wave related event, FIG. 9B illustrates that the above mentioned embodiments implement a quick path on the work flow to find such events via the following steps (shown as p701~p704): 1) seeing there is an abnormal event due to monitoring on specific free electrons via making use of the environment-pre-checking module of the first sub-system, and the second sub-system confirms the current entanglement is not stable; 2) the above abnormal event is determined as a suspicious event via making use of the position-and-momentum transformation module of the third sub-system; 3) also confirms there is abnormal decoherence in the local communication environment; and 4) performing gravity-wave analysis process on variation of optical frequency and variation of time dilation via making use of optical atomic clock related technology.

However, still referring to FIG. 9A, in the same embodiments, if the ripple-in-spacetime detection unit U118 fails to determine that the local quantum communication environment is impacted by factors of spacetime variation (related to gravity waves), the third sub-system will trigger the time-and-frequency transformation module M302 to determine whether the current abnormal decoherenced states also involves suspicious factors and whether the third sub-system should collaborate with a set of subroutines with coded algorithms for performing C.S.C.O. (complete set of commuting observables) operations on the decoherenced states for quantum information recovery, and whether to prepare hyper-entangled states for collaborating with a security communication unit to secure and stabilize current quantum communication via making use of QSDC (quantum secure direct communication) protocol. Wherein the consideration to implement such an embodiment is that even the system cannot determine the current event is related to gravity-wave factors, since the position-and-momentum transformation module M301 and the time-and-frequency transformation module M302 have determined that both of the observed specific free electrons and observed decoherence are not in scientific rationality, that implies there is still some unknown space-time factors affecting the local communication environment, thus the system still needs to be concerned with information recovery and robust transmission.

Thereby, the above embodiments of the present invention support to implement a surveillance system for use in quantum communication environments to resist quantum-computing threats in various quantum-teleportation channels. The present invention provides a complete architecture of quantum-computing threat resistance for general quantum communication environments. This technology can be implemented on a transceiver or a cloud service platform meanwhile collaborating with apparatuses for capturing and monitoring specific free electrons outside the surface of optical transmission media for various light sources. In some embodiments, this technology not only detects and blocks quantum-computing threats, but is also optional to implement basic or advanced counterattacking modules. In addition, the relevant technical means of this system can be practiced by devices working in general environments, and also provides several effects of quantum cyber-security mechanism that cannot be supported by the current PQC or QKD schemes for use in a quantum communication, for example, a sub-system for supporting event alerts and history logs, and a proprietary database of patterns, so as to facilitate a 24/7 security communication service.

While the present disclosure has been described by means of specific embodiments, numerous modifications and variations could be made thereto by those skilled in the art without departing from the scope and spirit of the present disclosure set forth in the claims.

What is claimed is:

1. A quantum-computing threats surveillance system for use in quantum communication environments comprising:
    at least a first sub-system to monitor free electrons and decoherenced states for labeling abnormal events to be further analyzed, and
    a second sub-system for entanglement measures within current quantum communication environments to evaluate whether received entangled states are not stable enough, so as to escalate warning status for a system administrator, wherein the first sub-system at least comprises:
    an environment-pre-checking module which labels abnormal events via analyzing captured free electrons in a specific duration;
    a decoherence monitoring unit which labels abnormal events via monitoring decoherenced states in a specific duration; and
    a system-environment patterning module which parameterizes system environments when an abnormal event is labeled to be escalated and then triggers the second sub-system with patterned parameters of the system environments;
wherein the second sub-system is for applying entanglement measuring procedures and comprises:
    an entanglement-measures mapping module which performs a procedure to map a set of entanglement measures to positive real numbers via making use of a density operator;
    an entanglement-measures filtering module which performs a procedure to discard the cases that mapping result of entanglement measures is zero;
    an entanglement-measures reducing module for performing a procedure which reduces the mapped entanglement measures to von-Neumann entropy; and
    an LOCC operation module which performs operations of LOCC (local operations and classical communication) on the measures output from the entanglement-measures reducing module so as to confirm whether the current entangled states are not stable enough;
and then the second sub-system determines whether to collaborate with a security communication unit to secure and stabilize current quantum communication via making use of hyper-entangled states with QSDC (quantum secure direct communication) protocol;
    wherein the quantum-computing threats surveillance system comprises a combination of electronic apparatuses, sub-systems, and a cloud platform to implement the quantum-computing threats surveillance system;
    wherein each above-mentioned module or unit in the quantum-computing threats surveillance system is for performing software subroutines, programming logics, or firmware applications and includes a set of loadable instructions with coded algorithms stored in non-volatile rewriteable memory.

2. The quantum-computing threats surveillance system for use in quantum communication environments according to claim 1, wherein in order to have an efficient performance index in analyzing captured free electrons, a first sub-system further includes a plurality of devices for providing output data about captured electrons to be collaborated with the environment-pre-checking module, the plurality of devices including:
    a device for detecting Auger electrons from a surface of transmission media and then deriving probability distribution data for the environment-pre-checking module, wherein the transmission media is an optical path for single photons in the environment of quantum communication;
    a device for detecting spin-Hall effect caused by extrinsic spin-orbit coupling with free electrons outside the surface of transmission media and then deriving probability distribution data for the environment-pre-checking module, wherein the transmission media is an optical path for single photons, so as to confirm that the quantum communication environment exists a meaningful external impact; and
    a device which probes and scans closely to the surface of transmission media wherein the transmission media is an optical path for single photons for detecting free electrons caused by quantum tunneling effect and then derives probability distribution data for the environment-pre-checking module, so as to confirm that the quantum communication environment exists a meaningful change on local system kinetic energy.

3. The quantum-computing threats surveillance system for use in quantum communication environments according to claim 1, wherein in order to monitor decoherenced states in a practical way, the decoherence monitoring unit of the first sub-system further performs following subroutines comprising:
    a subroutine for performing a Hermitian operation on a first matrix of observed quantum states to derive a second matrix;
    a subroutine for performing a conjugate-transpose operation on the derived second matrix to verify whether the second matrix is a Hermitian matrix; and
    a subroutine for deriving bases from the first matrix of quantum states in a Hilbert space to confirm that the current quantum states are still mapped to Hilbert space stably.

4. The quantum-computing threats surveillance system for use in quantum communication environments according to claim 3, wherein in order to confirm whether a suspicious event should be treated as a quantum-computing threat, the system further comprises:
    a third sub-system comprising at least one processor and a virtual machine for performing specific Fourier transform processes to analyze whether the variation of local potential energy and the relation of time-and-frequency is reasonable, and
    a fourth sub-system comprising a cloud platform with a plurality of processors and a plurality of virtual machines which applies a Lotka-Volterra equation module for analyzing space and time with Lotka-Volterra competition models to evaluate whether a suspicious event should be escalated to an advanced threat level so as to trigger a risk alert,
    wherein the third sub-system at least comprises:
    a position-and-momentum transformation module making use of a position-and-momentum Fourier transform to analyze scientific rationality of the observation derived from captured free electrons; and
    a time-and-frequency transformation module making use of the time-and-frequency Fourier transform to analyze scientific rationality of the observation derived from decoherenced quantum states;
and then triggers the fourth system for analyzing unreasonable observations determined by the third sub-system;
wherein the fourth sub-system applies analysis based on Lotka-Volterra competition models and comprises:

a Lotka-Volterra competition model mapping unit which conducts a competitive Lotka-Volterra equation model on the observations to perform a mapping process between an initial state and a final state from a dynamical-system point of view in an observed duration; and a Lorentz-invariant verification unit which verifies that there is no Lorentz invariant existing in a spacetime based on an observed duration;

so that the fourth system can acknowledge that some space or time factor of the local quantum communication environment has been changed with observed unreasonable variation caused by external impact.

5. The quantum-computing threats surveillance system for use in quantum communication environments according to claim 4, wherein in order to verify the scientific rationality based on the observations of captured free electrons, the third sub-system further comprises the following units to collaborate with the position-and-momentum transformation module of the third sub-system:

a spectral analysis unit which performs a spectral analysis process on the result of the position-and-momentum Fourier transform for the observations of captured free electrons, so as to derive a linear combination of quantum harmonic oscillators;

a basis resolution unit which performs a basis resolution process to derive bases of the linear combination of quantum harmonic oscillators;

an uncertainty-principle verification unit which performs an uncertainty-principle verification process to verify whether the result of the position-and-momentum Fourier transform fits uncertainty principle;

a block-list unit which adds resolved bases into a block list when the verified result fits uncertainty principle; and a wave-function database unit which stores wave functions expressed by the corresponding linear combination of quantum harmonic oscillators.

6. The quantum-computing threats surveillance system for use in quantum communication environments according to claim 4, wherein in order to verify the scientific rationality based on the observation derived from decoherenced quantum states, the third sub-system further comprises the following units to collaborate with the time-and-frequency transformation module of the third sub-system:

a temperature-controller unit and an optical-interference resistant unit to collaborate with a decoherence measurement process so as to confirm that the current abnormal observations of decoherenced states are not caused by temperature or optical interference factors;

a ZPE analysis unit to perform a ZPE (zero-point energy) analysis process for confirming that the current abnormal observations of decoherenced states are not caused by ZPE factors;

a true-randomness analysis unit which collaborates with a quantum random number generator to perform a true-randomness analysis process on the observations of decoherenced states for determining whether the current abnormal observations are in randomness; and a covariance-and-correlation analysis unit which collaborates with a true-randomness analysis unit to perform a covariance-and-correlation analysis process with the result of time-and-frequency Fourier transform on the observations of decoherenced states for confirming that the current abnormal observations are not caused by factors of local quantum communication environment.

7. The quantum-computing threats surveillance system for use in quantum communication environments according to claim 4, wherein in order to verify a possible quantum-computing threat, the fourth sub-system further comprises the following units to collaborate with the Lotka-Volterra equation module of the fourth sub-system:

a universe-variability analysis unit which performs a universe-variability analysis process when the Lorentz-invariant verification unit of the fourth sub-system determines that there is no Lorentz invariant existing in a spacetime based on an observed duration, so as to confirm whether the current quantum communication environment is impacted by factors of space curve, space collapse, or space singularity;

a gravitational-redshift analysis unit which performs gravitational-redshift analysis process when the Lorentz-invariant verification unit of the fourth sub-system determines that there is no Lorentz invariant existing in a spacetime based on an observed duration, so as to confirm whether the current quantum communication environment is impacted by factors of gravity anomaly; and a ripple-in-spacetime detection unit which performs gravity-wave analysis process when the Lorentz-invariant verification unit of the fourth sub-system determines that there is no Lorentz invariant existing in a spacetime based on an observed duration, so as to confirm whether the current quantum communication environment is impacted by factors of gravity waves.

8. The quantum-computing threats surveillance system for use in quantum communication environments according to claim 4, wherein in order to verify a possible quantum-computing threat, the Lotka-Volterra equation module of the fourth sub-system collaborates with a local-hidden-variables analysis to determine that there is time related impact factor on observed decoherenced states so as to collaborate with a C.S.C.O. (complete set of commuting observables) operation module for quantum information recovery, wherein the fourth sub-system further comprises:

a time-dilation analysis unit which performs time-dilation analysis process when the Lorentz-invariant verification unit of the fourth sub-system determines that there is no Lorentz invariant existing in a spacetime based on an observed duration, so as to confirm whether the current quantum communication environment is impacted by factors of time dilation;

a T-symmetry detection unit which performs time-symmetry analysis process when the Lorentz-invariant verification unit of the fourth sub-system determines that there is no Lorentz invariant existing in a spacetime based on an observed duration, so as to confirm whether there is time reversal invariance with the observations in the local quantum communication environment; and a ripple-in-spacetime detection unit which performs gravity-wave analysis process when the Lorentz-invariant verification unit of the fourth sub-system determines that there is no Lorentz invariant existing in a spacetime based on an observed duration, so as to confirm whether the current quantum communication environment is impacted by factors of gravity waves.

9. The quantum-computing threats surveillance system for use in quantum communication environments according to claim 4, wherein in order to trace possible quantum-computing threats in quantum communication environment, the system further comprises:

a fifth sub-system for performing quantum-teleportation analysis processes to label various teleportation channels, and a sixth sub-system for logging and analyzing history events, wherein the fifth sub-system at least comprises:

a Bell-measurements analysis unit for performing Bell-measurements analysis process to find the cases that the received quantum state is not in maximum entanglement; and a local-hidden-variables analysis unit for performing local-hidden-variables analysis process to label local hidden variables via making use of Gisin's theorem and POVM (positive operator-valued measure) for impacted local quantum communication environment;

and then triggers the sixth system for tracing history logs; wherein the sixth sub-system comprises:

an event-alert module which provides alerts for possible quantum-computing threats or quantum communication quality events;

a quantum communication blocking module for blocking a quantum communication according to corresponding escalation levels;

a key recycling module for enabling a key-recycling process according to an observed attacking cycle of a quantum-computing threat;

a history-logs classification module to classify event data stored in the history logs; and a behavior analysis module for performing behavior analysis on the possible quantum-computing threats.

10. The quantum-computing threats surveillance system for use in quantum communication environments according to claim 4, wherein in order to perform suitable actions on impacted quantum information, the system further comprises a seventh sub-system for performing information recovery processes to recover impacted quantum information or qubits caused by factors of time dilation, time-asymmetry, or ripple in spacetime, wherein the seventh sub-system excludes factors related to optical interference first, and at least comprises:

a photon capture-and-storage module for capturing photons and storing photons at least for milliseconds;

a prototype-quantum-node recovery module for correction of signal loss in local quantum communication environment; and a C.S.C.O. operation module for performing operations of C.S.C.O. (complete set of commuting observables) to recover degenerated quantum information or qubits.

11. The quantum-computing threats surveillance system for use in quantum communication environments according to claim 5, wherein in order to classify a specific quantum-computing threat, the third sub-system collaborates with the decoherence monitoring unit to confirm that there is not only abnormal spacetime variation but also abnormal decoherenced states in current quantum communication environment, and then collaborates with a ripple-in-spacetime detection unit which performs gravity-wave analysis process via making use of optical atomic clocks, so as to determine whether current quantum communication environment is impacted by factors of gravity waves, wherein the decoherence monitoring unit helps to observe received quantum states in a specific duration and includes a set of loadable instructions with coded algorithms stored in non-volatile rewriteable memory for performing the following subroutines step by step:

a subroutine for performing Hermitian operation on a first matrix of observed quantum states to derive a second matrix;

a subroutine for performing conjugate-transpose operation on the derived second matrix to verify whether the second matrix is Hermitian matrix; and a subroutine for deriving bases from the first matrix of quantum states in a Hilbert space to confirm that the current quantum states are still mapped to Hilbert space stably.

12. The quantum-computing threats surveillance system for use in quantum communication environments according to claim 11, wherein in order to classify a specific quantum-computing threat, once the third sub-system confirms that there is not only abnormal spacetime variation but also abnormal decoherence in current quantum communication environment, but fails to determine that the current quantum communication environment is impacted by factors of gravity waves, the third sub-system will trigger a time-and-frequency transformation module to determine whether the current abnormal decoherence also involves time related factors and whether the third sub-system should collaborate with a C.S.C.O. (complete set of commuting observables) operation on the impacted states for quantum information recovery, wherein the third sub-system further comprises:

a temperature-controller unit and an optical-interference resistant unit to collaborate with a decoherence measurement process so as to confirm that the current abnormal observations of decoherenced states are not caused by temperature or optical interference factors;

a ZPE analysis unit to perform a ZPE (zero-point energy) analysis process for confirming that the current abnormal observations of decoherenced states are not caused by ZPE factors;

a true-randomness analysis unit which collaborates with a quantum random number generator to perform a true-randomness analysis process on the observations of decoherenced states for determining whether the current abnormal observations are in randomness; and a covariance-and-correlation analysis unit which collaborates with a true-randomness analysis unit to perform a covariance-and-correlation analysis process with the result of time-and-frequency Fourier transform on the observations of decoherenced states for confirming that the current abnormal observations are not caused by factors of local quantum communication environment.

13. The quantum-computing threats surveillance system for use in quantum communication environments according to claim 2, wherein in order to perform suitable actions on impacted quantum information, the system further comprises a seventh sub-system for performing information recovery processes to recover impacted quantum information or qubits caused by factors of time dilation, time-asymmetry, or ripple in spacetime, wherein the seventh sub-system excludes factors related to optical interference first, and at least comprises:

a photon capture-and-storage module for capturing photons and storing photons at least for milliseconds;

a prototype-quantum-node recovery module for correction of signal loss in local quantum communication environment; and a C.S.C.O. operation module for performing operations of C.S.C.O. (complete set of commuting observables) to recover degenerated quantum information or qubits.

14. A quantum-computing threats surveillance method relating to implementation of applications, solutions, and state-of-the-arts, for use in quantum communication environments, comprising the following operations:

a) finding abnormal events via monitoring specific free electrons and decoherenced states in a specific duration by means of environment-pre-checking module and means of quantum-state pre-checking module;
b) after an abnormal event is found, determining whether the current entanglement is stable enough by means of entanglement measurements and means of LOCC (local operations and classical communication);
c) once current entanglement status is determined that is not stable enough, performing specific Fourier transforms on observed free electrons and observed decoherence for labeling an advanced suspicious event by means of analysis with Fourier transforms;
d) once an advanced suspicious event is labeled, conducting Lotka-Volterra competition model for determining a risk event by means of dynamic-model evaluation and means of Lorentz-invariant verification;
e) based on the result derived from dynamic-model evaluation and Lorentz-invariant verification, labeling quantum teleportation channels via technology of Bell measurement and means of local-hidden-variables analysis; and
f) providing log-and-trace services for collaborating with the above operations, and providing quality services by means of signal-loss correction and means of degenerated-information recovery for unstable quantum communication determined by the above operations.

15. The quantum-computing threats surveillance method relating to implementation of applications, solutions, and state-of-the-arts, for use in quantum communication environments according to claim 14, wherein in order to find abnormal events via monitoring specific free electrons and decoherenced states in a specific duration, the means of environment-pre-checking module at least comprise:
a) detecting Auger electrons from the surface of transmission media which is an optical path for single photons via making use of differential energy spectrum or integrated spectrum, in order to monitor an abnormal event which is caused by an external light source in the environment of quantum communication, wherein the external optical frequency is equal to or higher than extreme-ultraviolet (EUV) frequency where EUV wavelength is between 10 nm and 121 nm;
b) detecting spin-Hall effect caused by extrinsic spin-orbit coupling via making use of voltage measurement on free electrons outside the surface of transmission media wherein the transmission media is an optical path for single photons, so as to confirm that the quantum communication environment exists a meaningful external impact on local potential energy and the impact may be caused by a visible light source; and
c) probing and scanning closely to the surface of transmission media wherein the transmission media is an optical path for single photons for detecting free electrons caused by quantum tunneling effect so as to confirm that in the quantum communication environment exists a meaningful change on local system kinetic energy and the impact may be caused by an external light source, wherein the optical frequency is equal to or lower than infrared light;
and in order to provide a proprietary suspicious-event filter for events about tampered information, events about variation of optical frequency, events about phase change, events about gravity impacts, and events about variation of electric filed or magnetic field, wherein the means of quantum-state pre-checking module at least comprise:
a) performing Hermitian operation on $M_o$ which is a matrix of observed quantum states, to derive a matrix $M_h$;
b) performing conjugate-transpose operation to verify whether the matrix $M_h$ is a Hermitian matrix;
c) deriving bases in a Hilbert space according to $M_o$ which is the matrix of observed quantum states, to confirm that the current quantum states are still mapped to Hilbert space stably; and
d) once there being any failure with any of the above operations, determining that there is a set of possible decoherenced states.

16. The quantum-computing threats surveillance method relating to implementation of applications, solutions, and state-of-the-arts, for use in quantum communication environments according to claim 14, wherein in order to implement operations with technical features of stabilization for entanglement, retransmission for teleportation failures, error correction for entanglement, threat detection for double-CNOT attacks and fault tolerance under collective noise channel, the means of entanglement measurements and means of LOCC (local operations and classical communication) at least further comprises:
a) mapping a set of entanglement measures to positive real numbers via making use of a density operator;
b) discarding the cases that the above mapping result of entanglement measures is zero that implies a complex system in measurement is not entangled;
c) reducing the above mapped entanglement measures to von-Neumann entropy as transformed measures;
d) to solve what the expected transformed state is via performing local operation on a spin state;
e) performing Schmidt decomposition on the original state and the expected transformed state for phase analysis and then checking the decomposed result with Nielsen's conditions;
f) performing catalytic conversion when the Nielsen's conditions are not satisfied;
g) to determine whether a catalyst state is needed for LOCC operation via performing a verification with sum of Schmidt coefficients in order; and
h) once the transformed measures are enough larger than the entanglement measures before the above operations or there is no condition for performing LOCC operations on current entanglement measures, determining that the current entangled states are not stable enough in a measured complex system.

17. The quantum-computing threats surveillance method relating to implementation of applications, solutions, and state-of-the-arts, for use in quantum communication environments according to claim 14, wherein in order to label an advanced suspicious event, the means of analysis with Fourier transforms include operations for leveraging position-and-momentum Fourier transform to analyze scientific rationality of the observation derived from captured free electrons and operations for leveraging time-and-frequency Fourier transform to analyze scientific rationality of the observation derived from decoherenced quantum states;
wherein the operations for leveraging position-and-momentum Fourier transform to analyze scientific rationality of the observation derived from captured free electrons at least comprise:
a) to obtain a transformed result via performing position-and-momentum Fourier transform for the observations of captured free electrons;
b) performing spectral analysis on the transformed result; based on a spectral analyzed result, if there being possible quantum harmonic oscillator within the observations, deriving a linear combination of quantum harmonic oscillators;

c) to obtain corresponding bases of the linear combination via resolving the derived linear combination of quantum harmonic oscillators; and
d) if there are resolved corresponding bases, verifying the transformed result with uncertainty principle; once the transformed result fitting uncertainty principle as well, determining that the observation violates scientific rationality;

and wherein the operations for leveraging time-and-frequency Fourier transform to analyze scientific rationality of the observation derived from decoherenced quantum states at least comprise:
　a) to obtain a transformed result via performing time-and-frequency Fourier transform for the observations of decoherenced states;
　b) confirming that the current observations of decoherenced states are not caused by temperature or optical interference factors;
　c) confirming that the expected value of the observations on decoherenced states are not closed to the expected value of ZPE (zero-point energy);
　d) performing a covariance-and-correlation analysis on the transformed result, so as to determine that the current observations are not caused by factors of local quantum communication environment;
　e) performing true-randomness analysis on the transformed result, so as to determine that the current observations are not in randomness; and
　f) once confirming that the current observations of decoherenced states are not in randomness nor caused by factors of local quantum communication environment, determining that the observation violates scientific rationality.

18. The quantum-computing threats surveillance method relating to implementation of applications, solutions, and state-of-the-arts, for use in quantum communication environments according to claim 14, wherein in order to determine whether a labeled advanced suspicious event is a risk event, the means of dynamic-model evaluation and means of Lorentz-invariant verification performed on observations of decoherenced states at least comprise:
　a) conducting competitive Lotka-Volterra equations to map the observations between an initial state and a final state from a dynamical-system point of view in a specific duration;
　b) to obtain an analyzed result via performing analysis on the variation of time-space between observed initial state and observed final state;
　c) based on the analyzed result, determining whether there is no Lorentz invariant existing in the space-time of Lorentz transform within the specific observed duration; and
　d) once determining that there is no Lorentz invariant existing in the space-time of Lorentz transform within a specific observed duration, treating the variation of observed states as an impact due to external effect.

19. The quantum-computing threats surveillance method relating to implementation of applications, solutions, and state-of-the-arts, for use in quantum communication environments according to claim 14, wherein in order to label a quantum teleportation channel, the means of local-hidden-variables analysis collaborating with technology of Bell measurement at least comprise:
　a) via leveraging Bell-measurement analysis, confirming that the observation violates local realism;
　b) via the way of entanglement measures, finding the cases that the received quantum state is not in maximum entanglement;
　c) according to current observations, leveraging Gisin's theorem to derive all of the possible entangled states;
　d) patterning the states derived by use of Gisin's theorem in form of POVM (positive operator-valued measure) as a result related to the influence of local hidden variables; and
　e) labeling a quantum teleportation channel via leveraging the patterned states formed with POVM.

* * * * *